(12) United States Patent
Atanassov et al.

(10) Patent No.: US 11,289,710 B1
(45) Date of Patent: Mar. 29, 2022

(54) BIMETALLIC NON-PGM ALLOYS FOR THE ELECTROOXIDATION OF GAS FUELS IN ALKALINE MEDIA

(71) Applicants: Plamen B. Atanassov, Santa Fe, NM (US); Alexey Serov, Albuquerque, NM (US); Monica Padilla, Albuquerque, NM (US); Ulises A Martinez, Albuquerque, NM (US)

(72) Inventors: Plamen B. Atanassov, Santa Fe, NM (US); Alexey Serov, Albuquerque, NM (US); Monica Padilla, Albuquerque, NM (US); Ulises A Martinez, Albuquerque, NM (US)

(73) Assignee: UNM Rainforest Innovations, Albuquerque, NM (US)

(*) Notice: Subject to any disclaimer, the term of this patent is extended or adjusted under 35 U.S.C. 154(b) by 311 days.

(21) Appl. No.: 15/952,881

(22) Filed: Apr. 13, 2018

Related U.S. Application Data

(63) Continuation-in-part of application No. 14/149,905, filed on Jan. 8, 2014, now abandoned.

(60) Provisional application No. 61/750,026, filed on Jan. 8, 2013.

(51) Int. Cl.
*H01M 4/90* (2006.01)
*H01M 4/88* (2006.01)
*C22C 45/04* (2006.01)
*C22C 19/03* (2006.01)
*B22F 9/08* (2006.01)
*B22F 9/04* (2006.01)

(52) U.S. Cl.
CPC .......... *H01M 4/905* (2013.01); *C22C 19/03* (2013.01); *C22C 45/04* (2013.01); *H01M 4/8814* (2013.01); *H01M 4/8825* (2013.01); *H01M 4/8882* (2013.01); *B22F 9/04* (2013.01); *B22F 9/082* (2013.01); *B22F 2009/043* (2013.01); *B22F 2301/15* (2013.01)

(58) Field of Classification Search
CPC .. H01M 4/905; H01M 4/8814; H01M 4/8825; H01M 4/8882; C22C 19/03; C22C 45/04; B22F 9/04; B22F 9/082
See application file for complete search history.

(56) References Cited

U.S. PATENT DOCUMENTS

| | | | | |
|---|---|---|---|---|
| 3,775,100 | A * | 11/1973 | Kizer | B22F 1/025 419/35 |
| 5,596,040 | A * | 1/1997 | Miya | C08L 71/123 525/133 |
| 2007/0256562 | A1* | 11/2007 | Routkevitch | C01B 3/323 96/11 |
| 2011/0287174 | A1* | 11/2011 | Calabrese Barton | H01M 4/8652 427/115 |

* cited by examiner

*Primary Examiner* — Helen Oi K Conley
(74) *Attorney, Agent, or Firm* — Gonzales Patent Services; Ellen M. Gonzales

(57) ABSTRACT

Electrooxidative materials and various method for preparing electrooxidative materials formed from an alloy of oxophilic and electrooxidative metals. The alloy may be formed using methods such as spray pyrolysis or mechanosynthesis and may or may not include a supporting material which may or may not be sacrificial as well as the materials.

13 Claims, 19 Drawing Sheets

Ni₃Mn

Ni₃Co

Ni₃Ag

Ni₃Cu

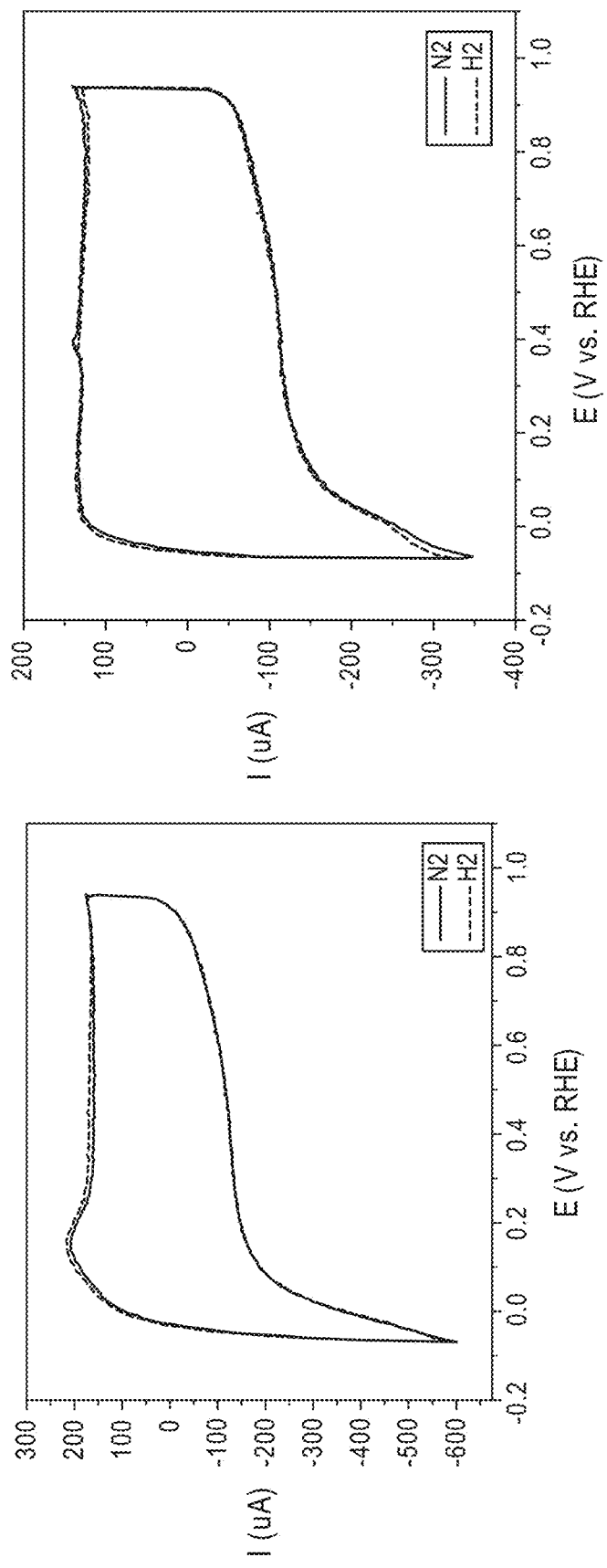

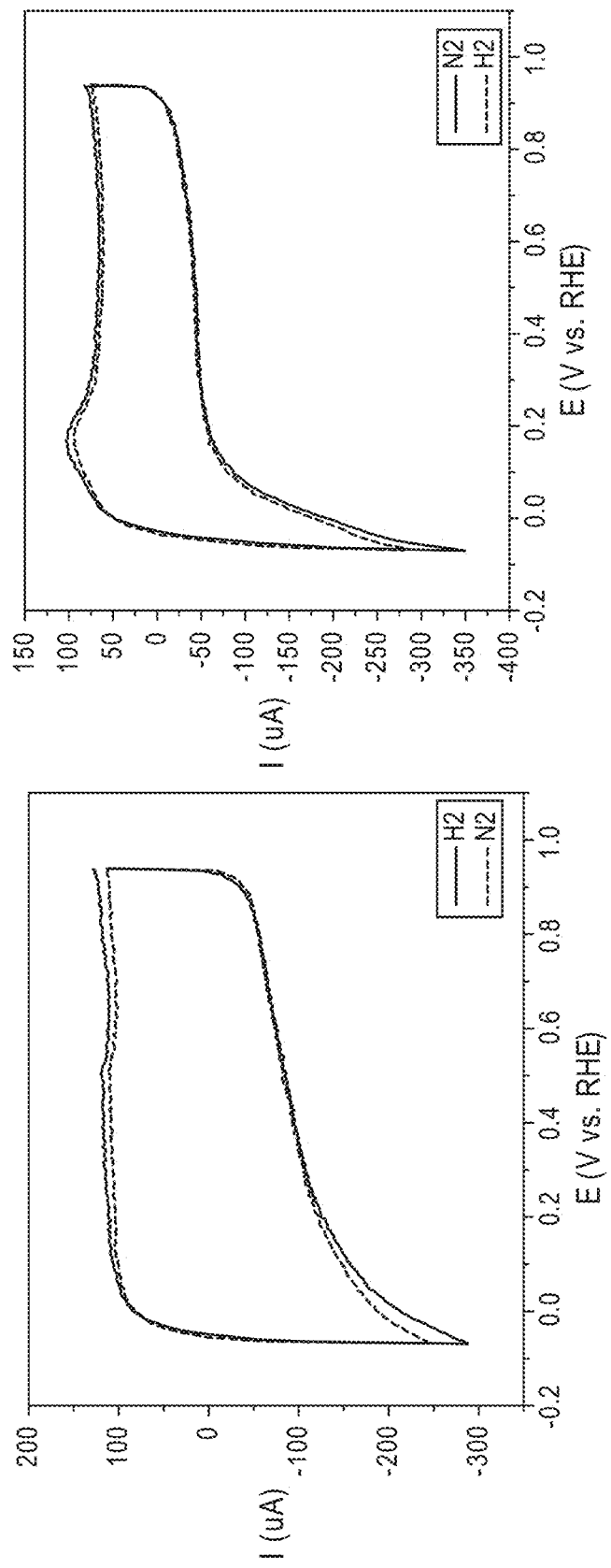

BIMETALLIC NON-PGM ALLOYS FOR THE ELECTROOXIDATION OF GAS FUELS IN ALKALINE MEDIA

CROSS-REFERENCE TO RELATED APPLICATIONS

The following application is a continuation-in-part of U.S. patent application Ser. No. 14/149,905, filed Jan. 8, 2014, which claims the benefit of U.S. Provisional Application No. 61/750,026 filed Jan. 8, 2014, each of which is hereby incorporated by reference in their entirety.

BACKGROUND

Fuel cells are receiving increasing attention as a viable energy-alternative. In general, fuel cells convert electrochemical energy into electrical energy in an environmentally clean and efficient manner. Fuel cells are contemplated as potential energy sources for everything from small electronics to cars and homes. In order to meet different energy requirements, there are a number of different types of fuel cells in existence today, each with varying chemistries, requirements, and uses.

As one example, Direct Methanol Fuel Cells (DMFCs) rely upon the oxidation of methanol on an electrocatalyst layer to form carbon dioxide. Water is consumed at the anode and produced at the cathode. Positive ions (H+) are transported across a proton exchange membrane to the cathode where they react with oxygen to produce water. Electrons can then be transported via an external circuit from anode to cathode providing power to external sources.

As another example, polymer electrolyte membrane (PEM) fuel cells (also called proton exchange membrane fuel cells) use pure hydrogen (typically supplied by a hydrogen tank) as a fuel. A stream of hydrogen is delivered to the anode side of a membrane-electrode assembly (MEA), where it is catalytically split into protons and electrons. As with the DMFC, the positive ions are transported across a proton exchange membrane to the cathode where they react with oxygen to produce water.

Currently, one of the limiting factors in the wide scale commercialization of PEM and DMFC fuel cells is the cost associated with precious metals. Both DMFC and PEM fuel cells commonly use platinum as an electrocatalyst. Noble metals such as platinum are needed to catalyze the sluggish oxygen reduction reaction (ORR) at the cathode. One of the major routes to overcome this limitation is to increase the platinum utilization in noble-metal based electrocatalysts. Another viable route is to use a less expensive, yet still sufficiently active catalyst in larger quantities. Several classes of non-platinum electrocatalysts have been identified as having adequate oxygen reduction activity to be considered as potential electrocatalysts in commercial fuel cell applications.

However, in fuel cell operations, pure metals possess a number of disadvantages in oxidation of gas fuels for fuel cell applications. These disadvantages are primarily related to the low activity of the metal, low durability during fuel cell operation, low utilization in the case of non-supported metals, or carbon corrosion in the case of supported metals.

SUMMARY

The present disclosure provides electrooxidative materials and various method for preparing electrooxidative materials formed from an alloy of oxophilic and electrooxidative metals. The alloy may be formed using methods such as spray pyrolysis, mechanosynthesis, or impregnation and may or may not include a supporting material which may or may not be sacrificial as well as the materials.

BRIEF DESCRIPTION OF THE DRAWINGS

FIG. 12 is a cyclic voltammogram showing the electrochemical activity of the $Ni_3Zr$ prepared using the ball-milling technique described herein.

FIG. 13 is a cyclic voltammogram showing the electrochemical activity of $Ni_3Sn$ prepared using the ball-milling technique described herein.

FIG. 16 is a cyclic voltammogram showing the electrochemical activity of $Ni_3In$ prepared using the ball-milling technique described herein.

FIG. 17 is a cyclic voltammogram h showing the electrochemical activity of $Ni_3W$ prepared using the ball-milling technique described herein.

DETAILED DESCRIPTION

Figure 1:
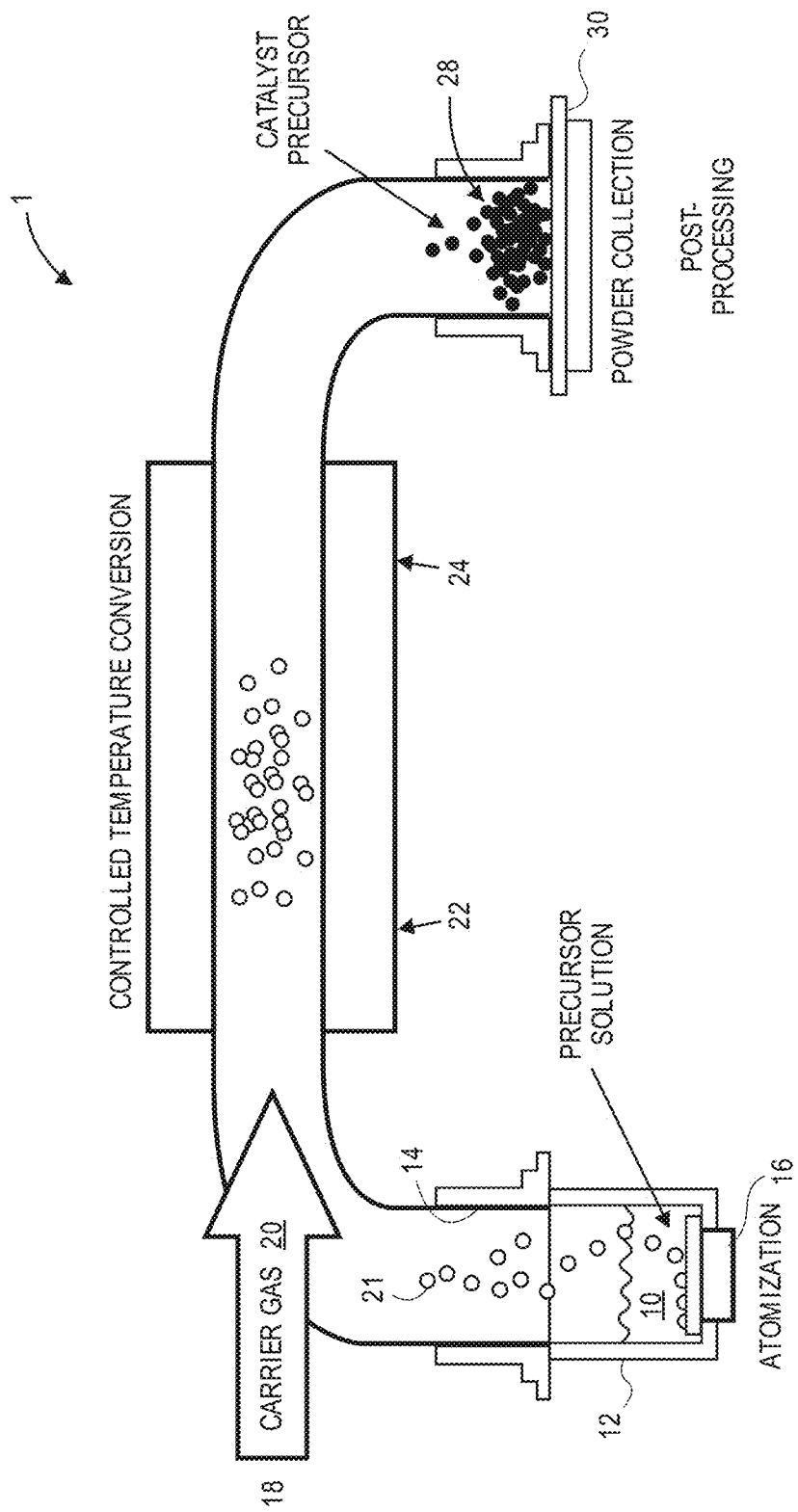
FIG. 1 is a schematic illustration of suitable apparatus for spray pyrolysis.
Figure 2:
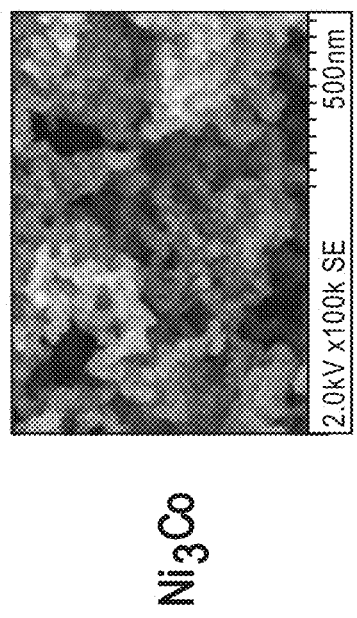
FIG. 2 is an SEM image of $Ni_3Mn$ prepared using the ball-milling technique described herein.
Figure 3:
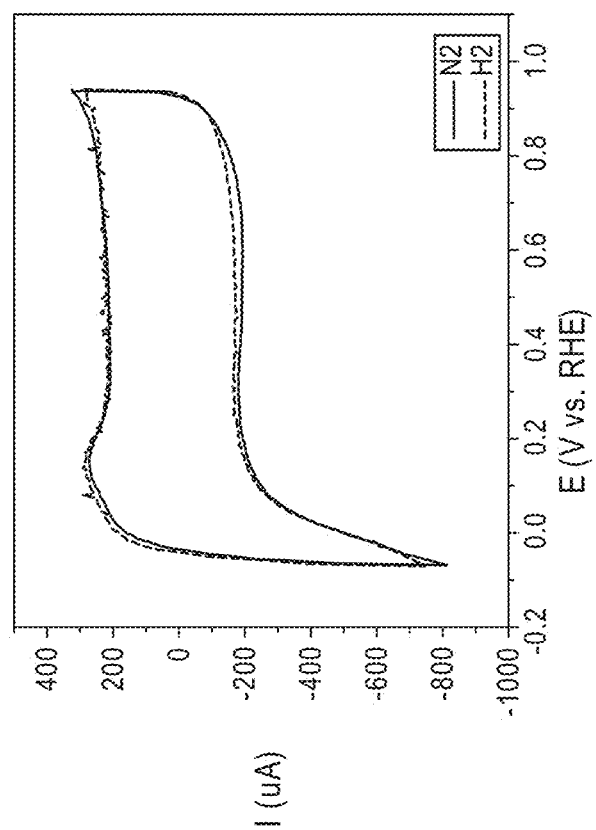
FIG. 3 is a cyclic voltammogram showing the electrochemical activity of the $Ni_3Mn$ of FIG. 2.
Figure 4:
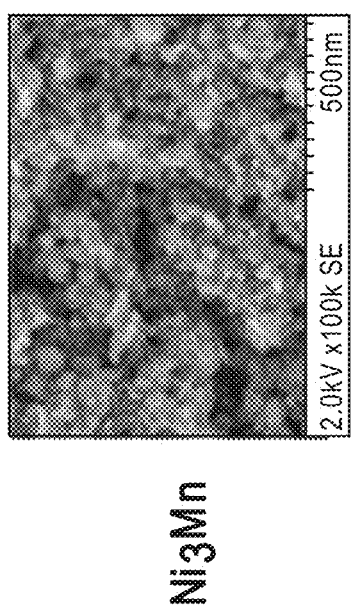
FIG. 4 is an SEM image of $Ni_3Co$ prepared using the ball-milling technique described herein.
Figure 5:
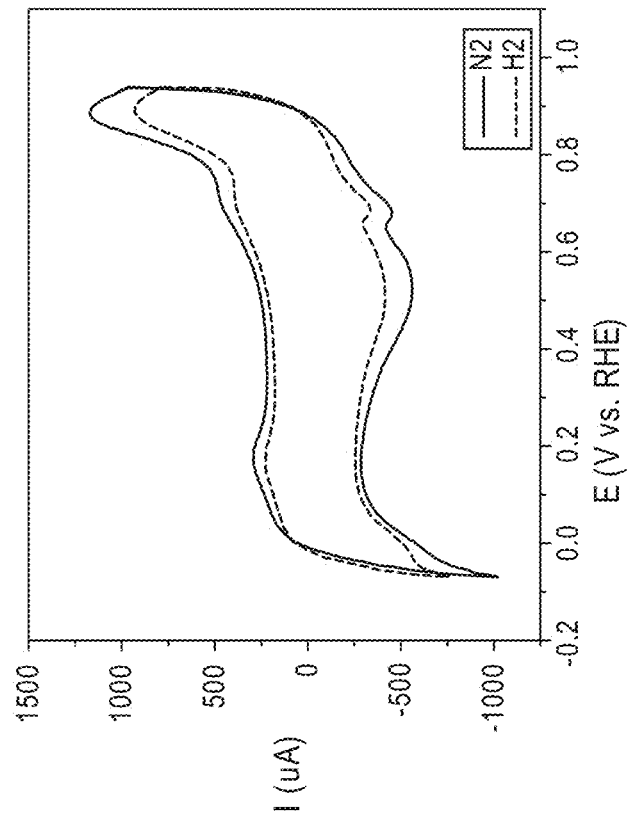
FIG. 5 is a cyclic voltammogram showing the electrochemical activity of the $Ni_3Co$ of FIG. 4.
Figure 6:
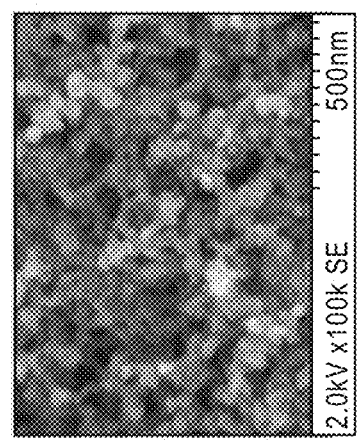
FIG. 6 is an SEM image of $Ni_3Ag$ prepared using the ball-milling technique described herein.
Figure 8:
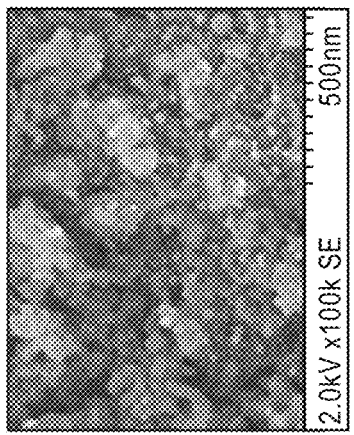
FIG. 8 is an SEM image of $Ni_3Ag$ prepared using the ball-milling technique described herein.
Figure 7:
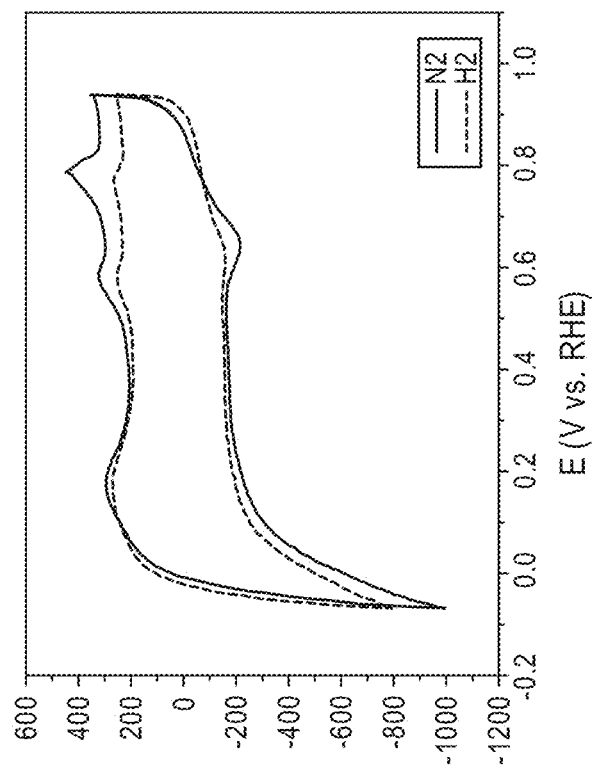
FIG. 7 is a cyclic voltammogram showing the electrochemical activity of the $Ni_3Ag$ of FIG. 6.
Figure 9:
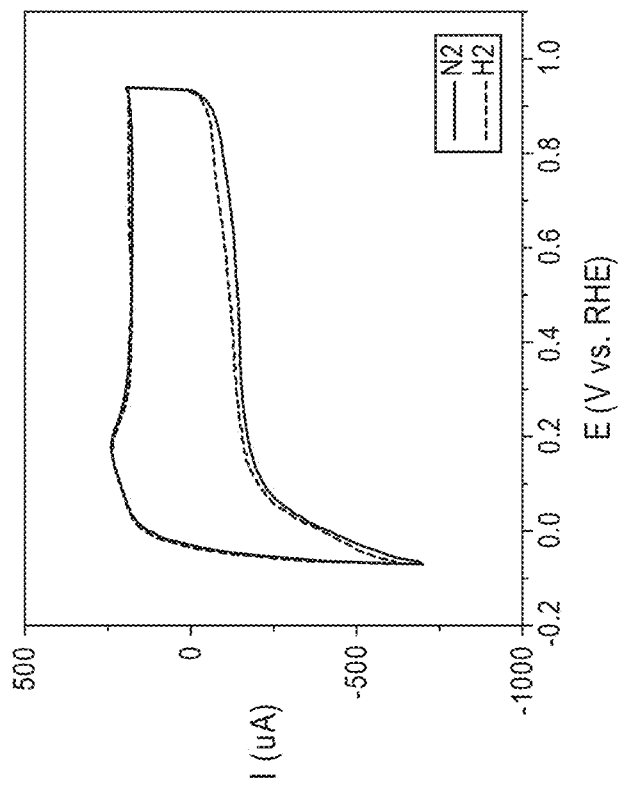
FIG. 9 is a cyclic voltammogram showing the electrochemical activity of the $Ni_3Cu$ of FIG. 8.
Figure 11:
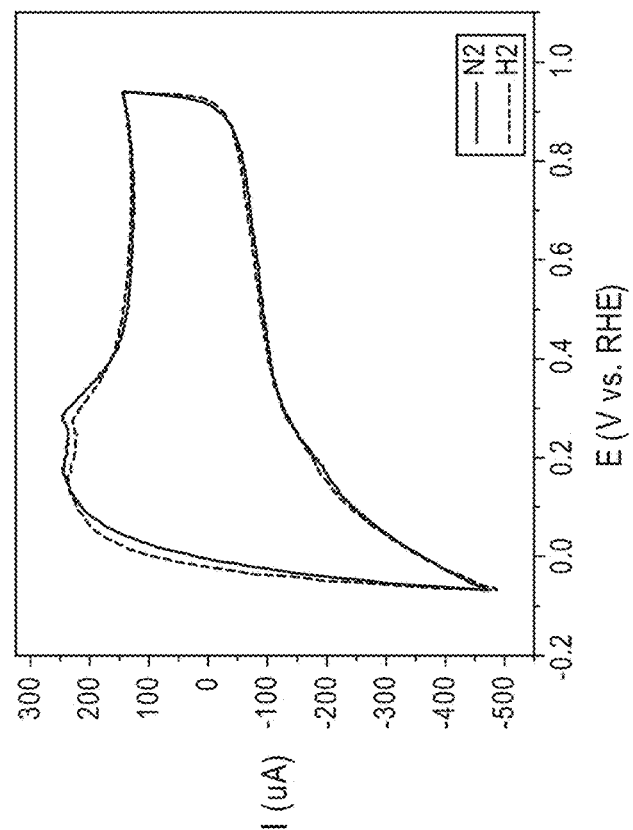
FIG. 11 is a cyclic voltammogram showing the electrochemical activity of the $Ni_3Fe$ prepared using the ball-milling technique described herein.
Figure 10:
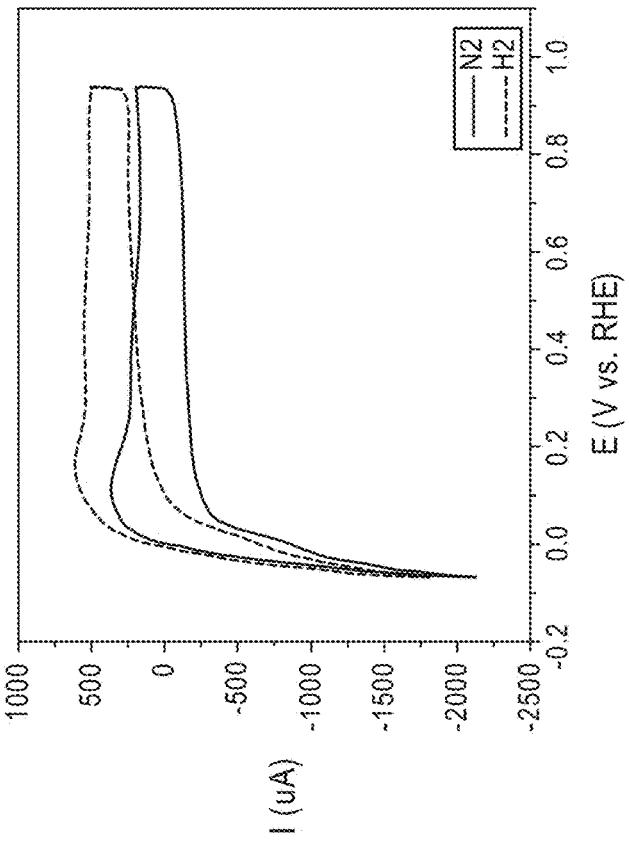
FIG. 10 is a cyclic voltammogram showing the electrochemical activity of the $Ni_3Pd$ prepared using the ball-milling technique described herein.
Figure 15:
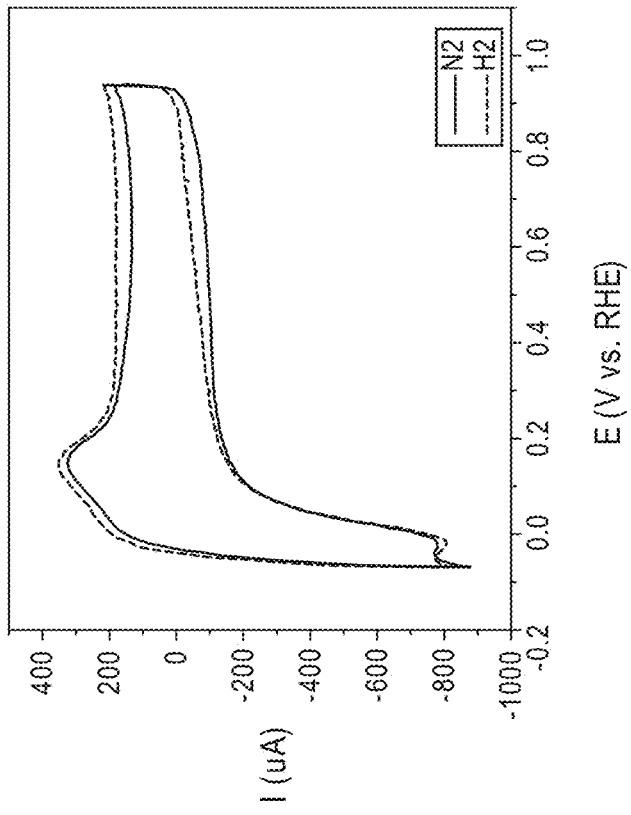
FIG. 15 is a cyclic voltammogram showing the electrochemical activity of $Ni_3Cr$ prepared using the ball-milling technique described herein.
Figure 14:
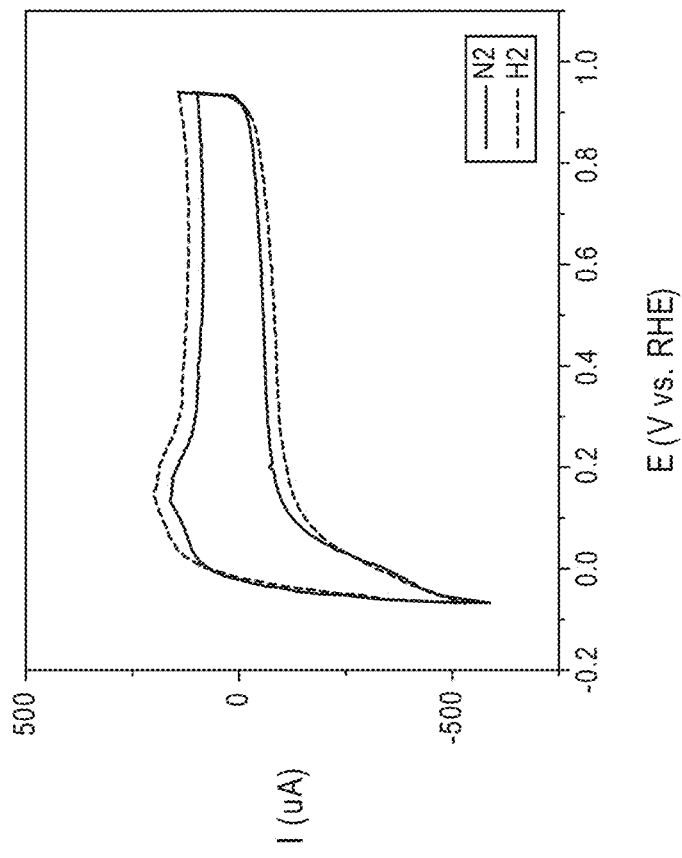
FIG. 14 is a cyclic voltammogram showing the electrochemical activity of $Ni_3Pb$ prepared using the ball-milling technique described herein.
Figure 19:
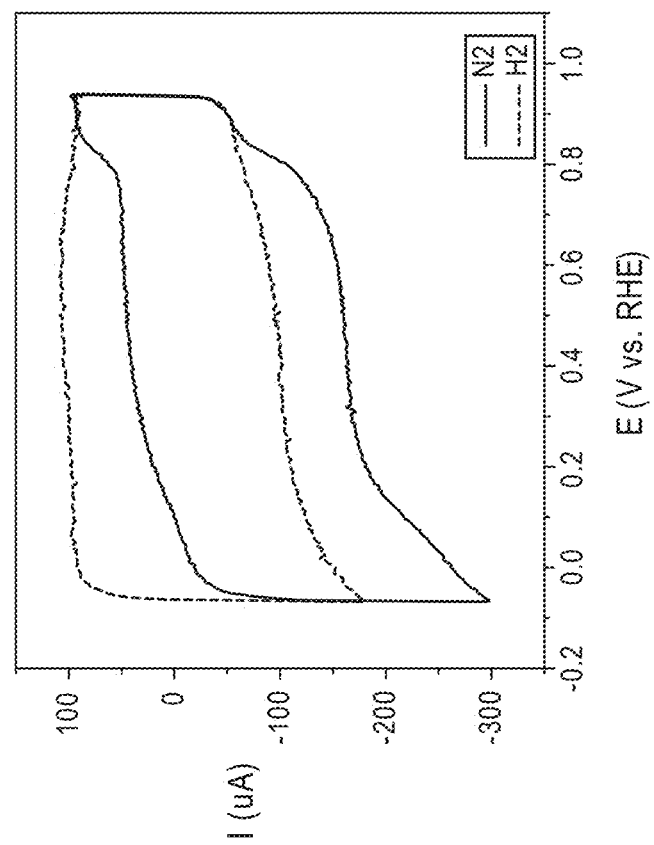
FIG. 19 is a cyclic voltammogram showing the electrochemical activity $Ni_3Nb$ prepared using the ball-milling technique described herein.
Figure 18:
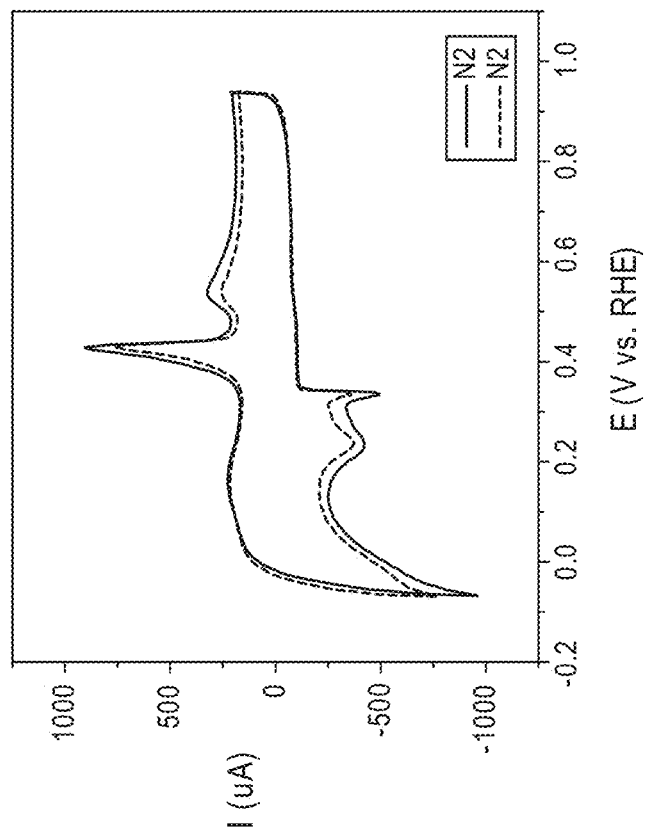
FIG. 18 is a cyclic voltammogram showing the electrochemical activity of $Ni_3Bi$ prepared using the ball-milling technique described herein.
Figure 20:
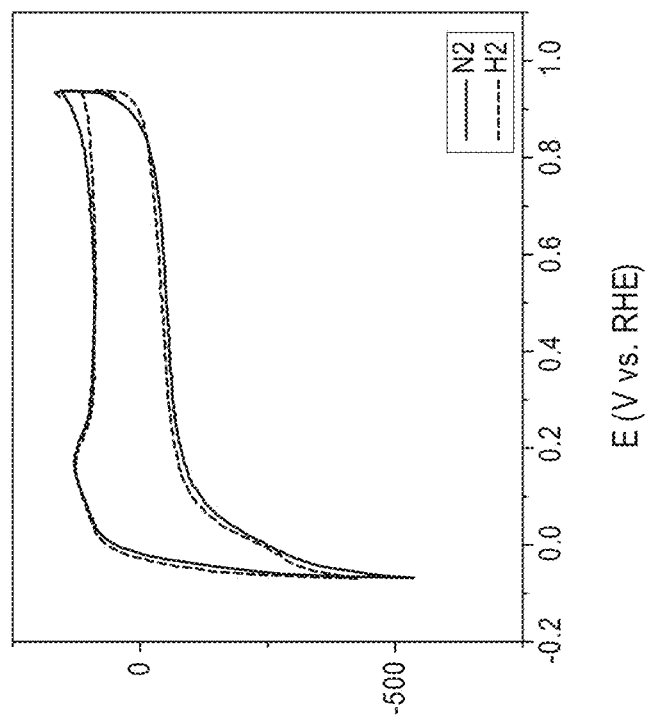
FIG. 20 is a cyclic voltammogram showing the electrochemical activity of the $Ni_3Mo$ prepared using the ball-milling technique described herein.
Figure 21:
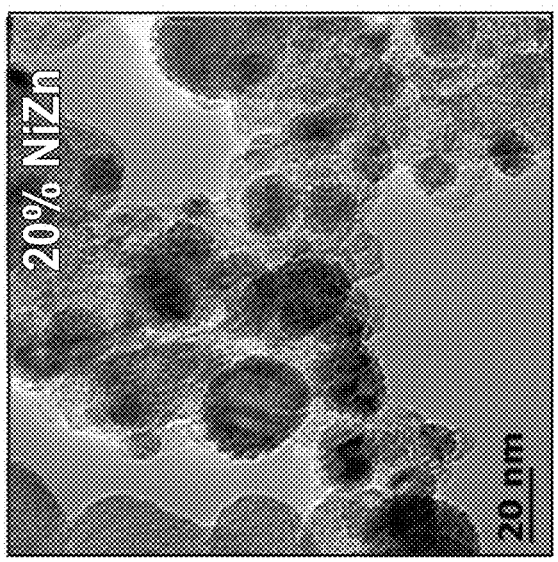
FIG. 21 is a TEM image of 20 wt % $Ni_{87}Zn_{13}$/KB formed using a wet impregnation technique with 20 wt. % NiZn.
Figure 22:
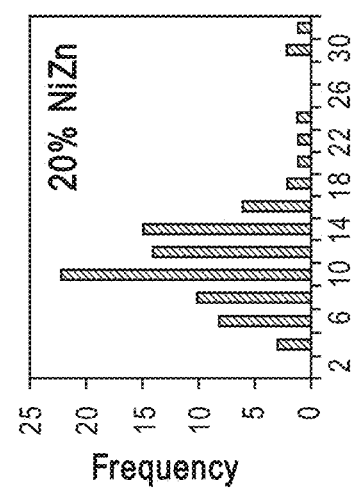
FIG. 22 is a graph showing the particle size distribution of the 20 wt % $Ni_{87}Zn_{13}$/KB of FIG. 21.
Figure 23:
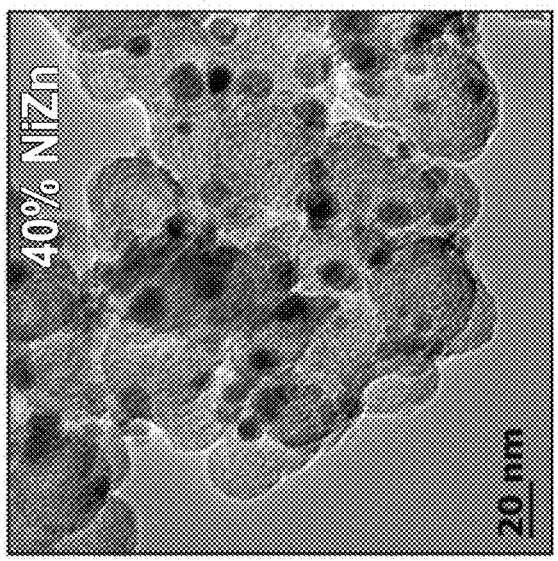
FIG. 23 is a TEM image of 40 wt % $Ni_{87}Zn_{13}$/KB formed using a wet impregnation technique with 40% NiZn.
Figure 24:
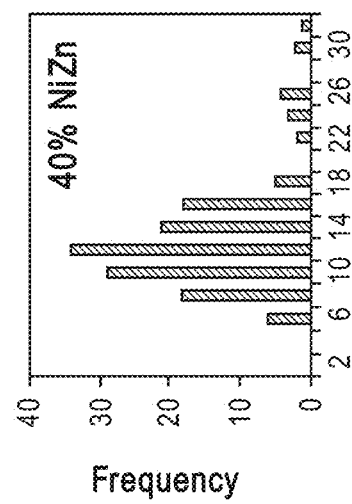
FIG. 24 is a graph showing the particle size distribution of the 40 wt % $Ni_{87}Zn_{13}$/KB of FIG. 23.
Figure 25:
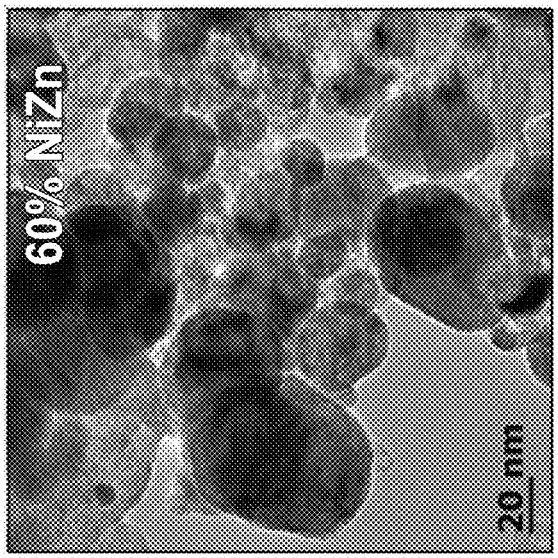
FIG. 25 is a TEM image of 60 wt % $Ni_{87}Zn_{13}$/KB formed using a wet impregnation technique with 60 wt. % NiZn.
Figure 26:
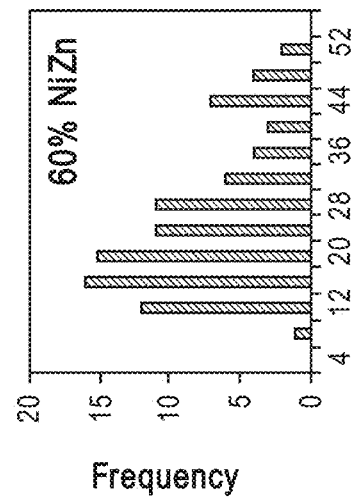
FIG. 26 is a graph showing the particle size distribution of the 60 wt % $Ni_{87}Zn_{13}$/KB of FIG. 25.
Figure 27:
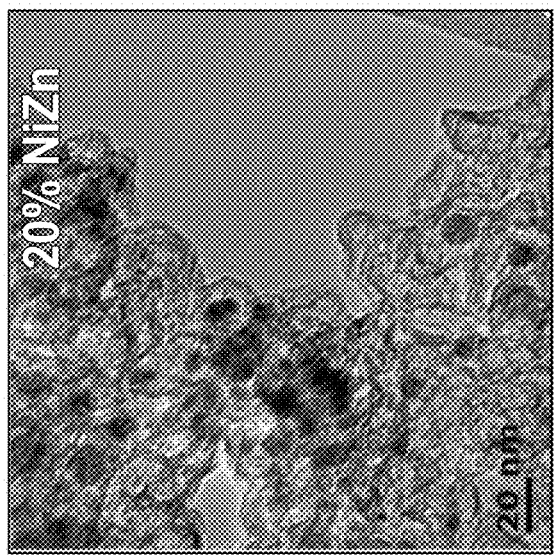
FIG. 27 is a TEM image of 20 wt % $Ni_{87}Zn_{13}$/KB formed using a ball-milling technique with 20 wt. % NiZn.
Figure 28:
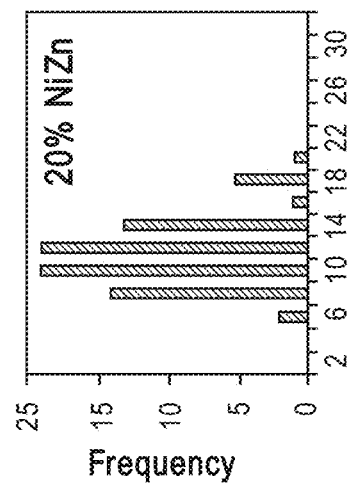
FIG. 28 is a graph showing the particle size distribution of the 20 wt % $Ni_{87}Zn_{13}$/KB of FIG. 27.
Figure 29:
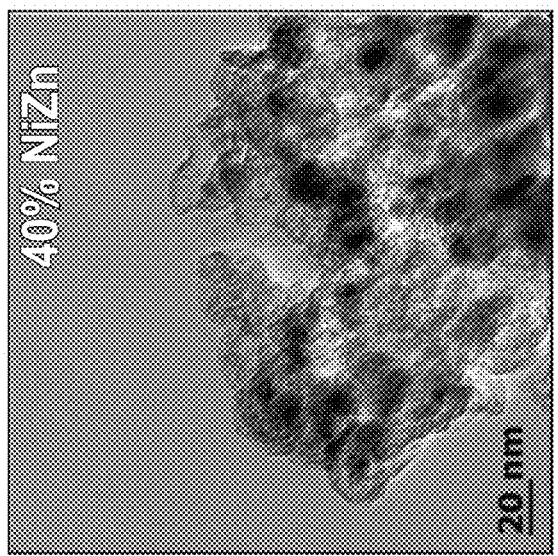
FIG. 29 is a TEM image of 40 wt % $Ni_{87}Zn_{13}$/KB formed using a ball-milling technique with 40% NiZn.
Figure 30:
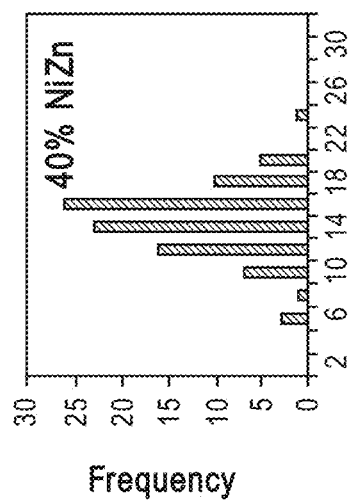
FIG. 30 is a graph showing the particle size distribution of the 40 wt % $Ni_{87}Zn_{13}$/KB of FIG. 29.
Figure 31:
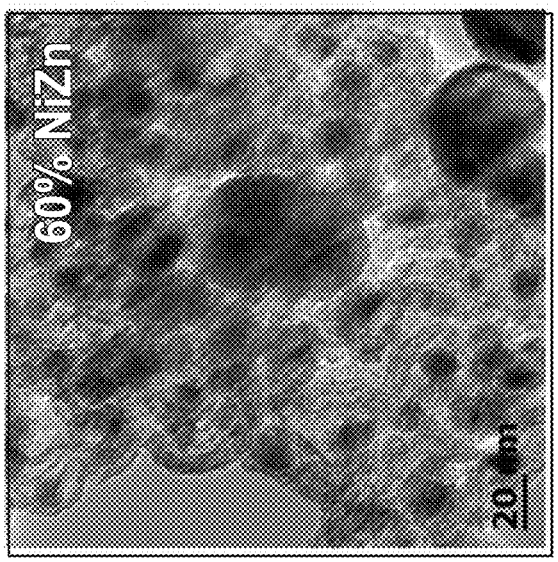
FIG. 31 is a TEM image of 60 wt % $Ni_{87}Zn_{13}$/KB formed using a ball-milling technique with 60 wt. % NiZn.
Figure 32:
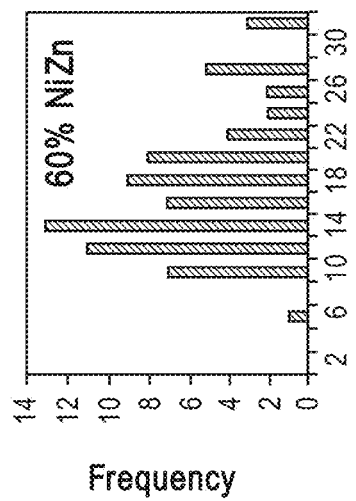
FIG. 32 is a graph showing the particle size distribution of the 60 wt % $Ni_{87}Zn_{13}$/KB of FIG. 31.
Figure 33:
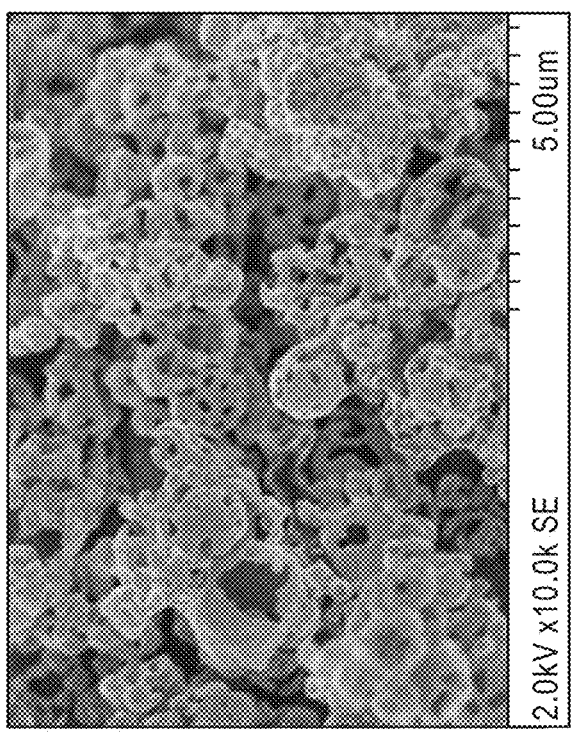
FIG. 33 is an SEM image of $Ni_{87}Zn_{13}$ prepared using the spray pyrolysis technique described herein.
Figure 34:
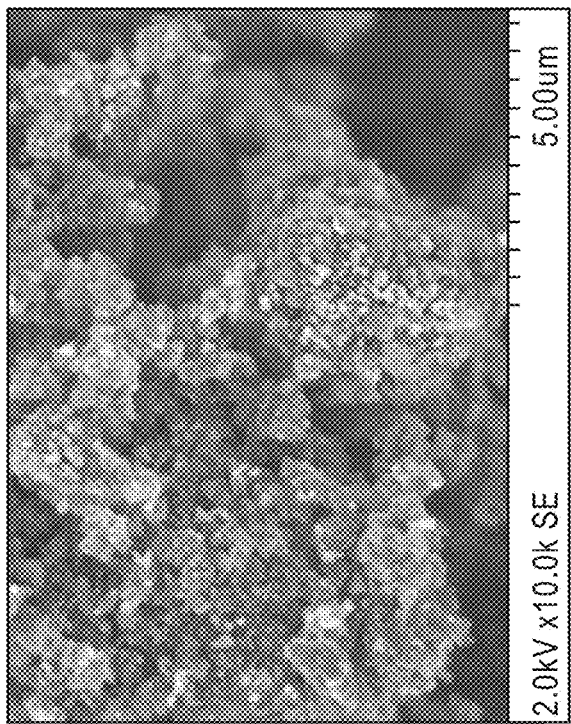
FIG. 34 is an SEM image of 60 wt % $Ni_{87}Zn_{13}$/KB formed using a ball-milling technique described herein.
Figure 35:
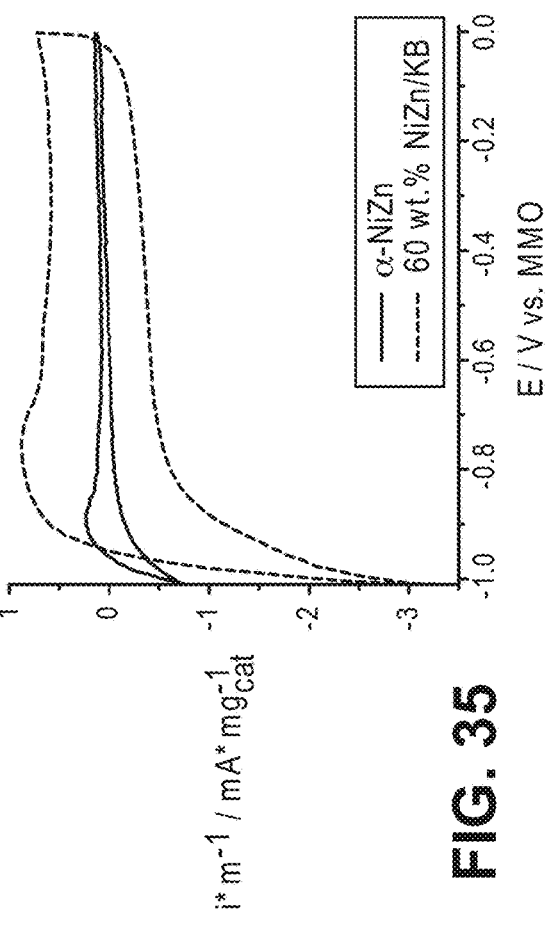
FIG. 35 is a cyclic voltammogram showing the electrochemical activity of the $Ni_{87}Zn_{13}$ and 60 wt % $Ni_{87}Zn_{13}$/KB of FIGS. 33 and 34, respectively.

According to an embodiment, the present disclosure provides bi-metallic materials including, but not necessarily limited to, alloys formed from an oxophilic metal and a metal having electrooxidative activity (referred to herein as an oxophilic/electrooxidative metal alloy) and methods for making the same. According to a specific embodiment, the materials are suitable for use to oxidize fuels in, for example, fuel cell membrane electrode assemblies (MEAs), stacks and fuel cell systems.

According to a first example, the oxophilic/electrooxidative metal alloy materials described herein may be synthesized by subjecting a mixture formed from precursors of an oxophilic metal and a metal having electrooxidative activity to wet impregnation, spray pyrolysis and/or mechanosynthesis followed by heat treatment.

Oxophilic metals form oxides by hydrolysis or abstraction of oxygen, often from organic compounds. Examples of oxophilic metals include manganese, nickel, iron, cobalt, copper, zinc, tin, titanium, niobium, and tungsten. Examples of precursors of oxophilic metals include, for example, metal nitrates, chlorides and acetates. Electrooxidative metals are able to oxidize fuels including, but not limited to hydrocarbons and alcohols. Examples of metals having electrooxidative activity include Mn, Co, Cu, Pd, Fe, Zr, Sn, Pb, Cr, In, W, Bi, Nb, Mo, and Zn. Examples of precursors of electrooxidative metals include, for example, metal nitrates, chlorides and acetates.

For the sake of clarity, in the present application the term "catalyst" is used to refer to a final product, suitable for use, for example, in a fuel cell, which has catalytic activity. The catalyst may include multiple types of materials, some of which may not in themselves have catalytic activity (for example, supporting material.) The term "catalytic material" is any material which has catalytic activity either on its own or as part of a catalyst.

In general, the method according to a first embodiment, includes forming a bimetallic oxophilic/electrooxidative metal alloy-based powder from a mixture of metal precursors through either spray pyrolysis, mechanosynthesis, or impregnation. As described in greater detail below, according to some methods a supporting material may be utilized during the method. This supporting material may or may not be sacrificial and some, none, or all of the supporting material may be included in the final product.

The ratio of oxophilic metal to electrooxidative metal may be selected to obtain the best outcome. Suitable ratios are likely to be greater than 50% oxophilic material, more likely to be between 70%-98% oxophilic material, and even more likely to be between 85-98% oxophilic material. As described in greater detail in the Example section, materials formed from 87% Ni, 90% Ni and 95% Ni were found to have desirable electrochemical activity.

In general, spray pyrolysis involves atomizing a precursor solution comprising oxophilic/electrooxidative metal precursors in order to form aerosolized liquid precursor droplets. In some methods, the initial solution may further contain other materials such as one or more solvents and/or other materials (including precursors of other materials) which can form an intermediary product with the oxophilic/electrooxidative precursors and/or which are included as part of the final product. The droplets are dried to allow for solvent evaporation (if solvents are present) and thermally decomposed via pyrolysis. The dried material, which is typically in the form of a powder, is then isolated, cooled to room temperature, collected, and subjected to post-treatment, if needed.

There are many advantages of synthesizing electrocatalytic alloyed materials by spray pyrolysis. For example, as described in greater detail below, the final morphology and composition of the electrocatalytic material can be determined by the composition of the precursor solution that is atomized. Furthermore, when spray pyrolysis is used to form alloys that incorporate a supporting material, the support and alloy constituent precursors are in close contact during synthesis which results in a more homogeneous final material as opposed to previously described bulk templating methods.

FIG. 1 depicts an exemplary aerosol reactor 1 in which the currently-described spray-pyrolysis-based method may be performed. As shown, a precursor solution 10 may be contained within a reservoir 12, which is connected via a feed tube 14 to an atomizer 16. The atomizer includes an inlet 18 through which a carrier/atomization gas 20 may be introduced. In some embodiments, the atomizer may take the form of a commercially available humidifier. However it will be appreciated that any convention apparatus for droplet generation may be used including nebulizers, collision nebulizers, ultrasonic nebulizers, vibrating orifice aerosol generators, centrifugal atomizers, two-fluid atomizers, electrospray atomizers, etc. The resulting aerosol droplets 21 are then transported through a drying zone 22 and a heating zone 24 so as to undergo a controlled temperature conversion. In some embodiments, an inert gas, such as nitrogen, is used as the carrier gas. Other examples of suitable carrier gases include argon, helium, and other insert gases. The resulting particles form a powder 28, which is then collected, for example, on a filter 28. Of course it will be appreciated that other collection devices such as cyclones, electrostatic separators, bag filters, filter discs, and the like may be used. In some embodiments, the filter or other collection device may be heated to ensure complete drying of the powder. For example, filter 28 may be locked between disks that are wrapped with a heating coil. Once the powder is dry, it can be collected and then heat treated, resulting in spherical mesoporous silica particles, as shown at 34. The metallic precursors in the resulting material 34 may then be reduced, for example under hydrogen flow to form material 36.

According to some embodiments, optimal temperatures for heat treatment are typically between 500° C. and 1100° C. According to some embodiments, heat treatment may preferably be between 750° C. and 900° C., or more preferably between 775° C. and 825° C. In some embodiments, heat treatment of around 800° C. is preferred, as our experimental data showed this temperature to produce catalysts having a high amount of catalytic activity for certain specific materials (see experimental section below).

As stated above, as an alternative to spray pyrolysis, a mechanosynthesis-based method may be utilized to produce the alloys described herein. In general, the herein described mechanosynthesis method employs ball-milling of the oxophilic/electrooxidative metal precursor materials. Like the spray pyrolysis-based method described above, this method may also incorporate a supporting material, which may or may not be sacrificial.

Ball-milling has been described previously as a method for filling the pores of a carbon support with a pore-filler. See e.g., Jaouen et al. However, in the methods described in the present disclosure, ball-milling is used to enable mechanosynthesis, alleviating the need for the use of a solvent during synthesis process. For the purposes of the present disclosure, the term “ball mill” is used to refer to any type of grinder that uses a grinding media to grind materials into fine powders and/or introduce to the system enough energy to initiate the desired chemical reaction.

In general, the presently described methods utilize the energy produced by ball-milling of the various precursor materials to drive a chemical reaction between the precursors. According to a more specific example, an electrooxidative material according to the present disclosure may be synthesized by ball milling precursors of oxophilic and electrooxidative metals under sufficient conditions to initiate a chemical reaction between the reactants. As with the above-described methods, the resulting material is then subjected to heat treatment, (such as pyrolysis) in an inert ($N_2$, Ar, He, etc.) or reactive ($NH_3$, acetonitrile, etc.) atmosphere at a sufficient temperature to produce an electrocatalytic material. According to some embodiments, the entire process is performed dry, by which is meant, in the complete absence of any solvents. According to one embodiment of a solvent-free process, all reactants (i.e. precursors) are combined in a ball mill in powder form and the entire process is conducted without the addition of any liquids. For the purposes of the present disclosure, a powder is a dry, bulk solid composed of a large number of very fine particles that may flow freely when shaken or tilted.

Because the method described herein can be practiced absent any solvents, the method enables the synthesis of electrooxidative materials made from or including insoluble materials. Examples of insoluble materials which can be included in the materials described herein according to the present disclosure include, but are not limited to, urea-melamine-formaldehyde polymer, melamine, Metal Organic Frameworks (MOFs), polyacrylonitrile, carbon, etc.

As stated above, according to some embodiments the oxophilic/electrooxidative alloys of the present disclosure are synthesized to include a supporting material. For example, if spray pyrolysis is used, wholly formed (either commercially purchased or previously synthesized) or precursors of the supporting material may be incorporated into the solution prior to atomization. If the mechanosynthesis method is used, the oxophilic/electrooxidative precursors are ball-milled in the presence of the supporting material, or precursors therefore. In either case, the supporting materials may be incorporated so as to enable infusion of the metal materials on, around, and throughout (if the supporting material is porous) the supporting material. Examples of suitable supporting materials include, but are not limited to carbon blacks, carbon nanotubes, graphene, graphene oxide, fullerene, etc. If a non-sacrificial support, like carbon black or the like, is used, the resulting material is a supported electrooxidative material.

As stated above, according to some embodiments, an impregnation technique may be used wherein the above-described precursor materials are exposed to and then allowed to impregnate a porous supporting material, such as those described above, and then subjected to suitable conditions, such as the heat treatments described above, to produce the alloys described herein.

As stated above, according to some embodiments the supporting material may be a sacrificial support. Examples of materials that can be used as a sacrificial support include silica, zeolites, aluminas, and the like. If a sacrificial support is used, the material is typically added (or synthesized) during the synthesis method and then removed as part of a post-processing step. The resulting material is an unsupported porous exectrooxidative material.

Of course it will be appreciated that given the high temperatures that the sacrificial support will be subjected to during the synthesis method, it is important to select a sacrificial support which is non-reactive to the catalytic materials under the specific synthesis conditions used. Accordingly, it will be appreciated that silica is a preferred material for the sacrificial support, but that other suitable materials, including those identified above, can be used.

It should be appreciated that according to some embodiments, the support, whether sacrificial or not, may be particulate in nature and take the form of spheres, or other two- or three-dimensional regular, irregular, or amorphous shapes. The particles may be monodisperse, or irregularly sized. The particles may or may not have pores and such pores may be of the same or different sizes and shapes.

It should be appreciated that if a sacrificial support is used, the size and shape of the sacrificial particles may be selected according to the desired shape(s) and size(s) of the voids within the electrooxidative material. Accordingly, by selecting the particular size and shape of the sacrificial particles, one can produce an electrooxidative material having voids of a predictable size and shape. For example, if the sacrificial particles are spheres, the electrooxidative material will contain a plurality of spherical voids. Those of skill in the art will be familiar with the electrocatalyst Pt—Ru black, which consists of a plurality of platinum-ruthenium alloy spheres. An electrooxidative material formed from using sacrificial spheres with the above-described method looks like a negative image of the Pt-Ru black; the space that existed as a void in the Pt-Ru black is filled with material, and the space that existed as metal electrocatalyst in the Pt-Ru black is void.

It is noted that the presently described embodiment provides a methodology that differs from methodologies that use a casting method to reproduce or replicate the morphology of a template. Specifically, in the embodiments described herein when template particles are particulate and dispersed and/or suspended in a medium, such as water, and the material is then allowed to form around the particles (some or all which may later be removed, in the case of sacrificial particles), the embodiment inherently results in an amorphous and irregularly shaped material having an unpredictable overall morphology, as it would be impossible to predict precisely where the template particles would localize relative to each other. Accordingly, while the shape and size of the voids within the material would be influenced by the size and shape of the sacrificial particles used, the actual spacing and relative location of the voids as well as the overall morphology of the material would be irregular and unpredictable.

As stated above, according to some embodiments, supporting-material particles of any diameter may be used. In some preferred embodiments, particles having characteristic sizes of between 1 nm and 100 nm may be used. In more preferred embodiments, particles having characteristic sizes of between 100 nm and 1000 nm may be used. In other preferred embodiments, silica particles having characteristic sizes of between 1 mm and 10 mm may be used.

As stated above, in those embodiments in which a sacrificial support is used, because the sacrificial support serves as the template for the formation of the electrooxidative material, the final porosity of the material can be selected based on the average diameter of the sacrificial support. For example, in an embodiment where sacrificial silica particles having an average diameter of 20 nm is used, the spherical voids in the electrocatalyst will typically have a diameter of approximately 20 nm. In one particular embodiment, a sacrificial silica template is formed from Cabosil amorphous fumed silica (325 $m^2/g$), resulting in a self-supported electrooxidative material with porosity in the 2-20 nm range. Those of skill in the art will be familiar with a variety of silica particles that are commercially available, and such particles may be used. Alternatively, known methods of forming silica (or other) particles may be employed in order to obtain particles of the desired shape and/or size.

As stated above, when a sacrificial support is used, the support is removed as part of the post-processing, typically after the pyrolysis step. For example, the sacrificial support may be removed via chemical etching. Examples of suitable etchants include NaOH, KOH, and HF. According to some embodiments, it may be preferable to use KOH, as it preserves all metal and metal oxide in the material and, if the species are catalytically active, use of KOH may, in fact, increase catalytic activity. Alternatively, in some embodiments, HF may be preferred as it is very aggressive and can be used to remove some poisonous species from the surface of the material. Accordingly, those of skill in the art will be able to select the desired etchants based on the particular requirements of the specific catalytic material being formed.

According to some embodiments, the presently described materials can also be synthesized using a double heat-treatment procedure. For example, in this embodiment, the oxophilic/electrooxidative metal precursors are infused in a sacrificial support, which is then subjected to a first heat treatment step, such as pyrolysis, in order to produce an intermediate material. The intermediate material is then subjected to a second heat treatment step, which may be, for example, a second pyrolysis treatment, resulting in newly formed active sites. After the second heat treatment, the sacrificial support is removed using chemical etching or other suitable means as described above.

In embodiments utilizing two separate heat treatment steps, it may be desirable for the different heat treatment steps to be conducted under different conditions, for example at different temperatures and/or for different durations of time. For example, the first heat treatment step may be performed at a higher temperature, such as 800° C. for 1 hr and the second heat treatment step may be performed at a temperature between 800 and 1000° C. for a period of time between 10 minutes and 1 hour.

The specific methods and compositions described herein are representative of preferred embodiments and are exemplary and not intended as limitations on the scope of the invention. Other objects, aspects, and embodiments will occur to those skilled in the art upon consideration of this specification and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and that they are not necessarily restricted to the orders of steps indicated herein or in the claims. As used herein and in the appended claims, the singular forms "a," "an," and "the" include plural reference unless the context clearly dictates otherwise. Thus, for example, a reference to "a catalyst" includes a plurality of such catalysts, and so forth.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All patents and publications referenced below and/or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications.

Additional information may be gathered from the Examples section below. The reaction tests shown and described in the drawings and in the following examples clearly demonstrate that catalysts prepared using the method described possess high Oxygen Reduction activity in acid media. Further, the mechanism of oxygen reduction shows the direct reduction of oxygen to water by a 4 electron pathway, preventing corrosive peroxide production and therefore improving stability and durability of catalysts. Thus, catalysts of the composition and using the preparation method described herein, including but not limited to the described materials shown herein, are effective catalysts for oxygen reduction.

Experimental Data:

1) Synthesis of Ni—Mn by Wet Impregnation Using a Sacrificial Support

First, 3 g of silica were dissolved in 25 ml of DI water. The 2.3 g of nickel nitrate were dissolved in 5 ml of DI water and 0.77 g of manganese nitrate was dissolved in 4 ml of DI water. Solutions were mixed together and water was evaporated at T=85 C for 8 h. Dry powder was ground and reduced in $H_2$ atmosphere T=450 C, t=4 h. Silica was removed by means of 7M KOH for 12 hours. Ni—Mn compound was washed with DI water until neutral pH was achieved.

2) Synthesis of Ni—Co by Wet Impregnation Using a Sacrificial Support

First, 5 g of silica were dissolved in 28 ml of DI water. The 3.4 g of nickel nitrate were dissolved in 5 ml of DI water and 1.03 g of cobalt nitrate was dissolved in 7 ml of DI water. Solutions were mixed together and water was evaporated at T=85 C for 8 h. Dry powder was ground and reduced in $H_2$ atmosphere T=470 C, t=4.5 h. Silica was removed by means of 7M KOH for 12 hours. Ni—Co compound was washed with DI water until neutral pH was achieved.

3) Synthesis of Ni—Pd by Wet Impregnation Using a Sacrificial Support

First, 2.6 g of silica were dissolved in 15 ml of DI water. The 4.2 g of nickel nitrate were dissolved in 5 ml of DI water and 0.97 g of palladium nitrate was dissolved in 2 ml of DI water. Solutions were mixed together and water was evaporated at T=85 C for 8 h. Dry powder was ground and reduced in $H_2$ atmosphere T=490 C, t=4 h. Silica was removed by means of 7M KOH for 12 hours. Ni—Pd compound was washed with DI water until neutral pH was achieved.

4) Synthesis of Ni—Fe by Wet Impregnation Using a Sacrificial Support

First, 6 g of silica were dissolved in 35 ml of DI water. The 1.3 g of nickel nitrate were dissolved in 5 ml of DI water and 0.43 g of iron nitrate were dissolved in 4 ml of DI water. Solutions were mixed together and water was evaporated at T=85 C for 8 h. Dry powder was ground and reduced in $H_2$ atmosphere T=550 C, t=4 h. Silica was removed by means of 7M KOH for 12 hours. Ni—Fe compound was washed with DI water until neutral pH was achieved.

5) Synthesis of Ni—Zr by Wet Impregnation Using a Sacrificial Support

First, 3 g of silica were dissolved in 25 ml of DI water. The 2.3 g of nickel nitrate were dissolved in 5 ml of DI water and 0.88 g of zirconium nitrate were dissolved in 4 ml of DI water. Solutions were mixed together and water was evaporated at T=85 C for 8 h. Dry powder was ground and reduced in $H_2$ atmosphere T=650 C, t=4 h. Silica was removed by means of 7M KOH for 12 hours. Ni—Zr compound was washed with DI water until neutral pH was achieved.

6) Synthesis of Ni—Sn by Wet Impregnation Using a Sacrificial Support

First, 3.2 g of silica were dissolved in 25 ml of DI water. The 4.3 g of nickel nitrate were dissolved in 5 ml of DI water and 1.87 g of $SnCl_4$ were dissolved in 14 ml of DI water. Solutions were mixed together and water was evaporated at T=85 C for 8 h. Dry powder was ground and reduced in $H_2$ atmosphere T=420 C, t=4 h. Silica was removed by means of 7M KOH for 12 hours. Ni—Sn compound was washed with DI water until neutral pH was achieved.

7) Synthesis of Ni—Pb by Wet Impregnation Using a Sacrificial Support

First, 3.5 g of silica were dissolved in 25 ml of DI water. The 1.6 g of nickel nitrate were dissolved in 5 ml of DI water and 0.25 g of led nitrate were dissolved in 4 ml of DI water. Solutions were mixed together and water was evaporated at T=85 C for 8 h. Dry powder was ground and reduced in $H_2$ atmosphere T=475 C, t=4 h. Silica was removed by means of 7M KOH for 12 hours. Ni—Pb compound was washed with DI water until neutral pH was achieved.

8) Synthesis of Ni—Cr by Wet Impregnation Using a Sacrificial Support

First, 1.3 g of silica were dissolved in 12 ml of DI water. The 1.3 g of nickel nitrate were dissolved in 5 ml of DI water and 0.23 g of chromium nitrate were dissolved in 4 ml of DI water. Solutions were mixed together and water was evaporated at T=85 C for 8 h. Dry powder was ground and reduced in $H_2$ atmosphere T=450 C, t=4 h. Silica was removed by means of 7M KOH for 12 hours. Ni—Cr compound was washed with DI water until neutral pH was achieved.

9) Synthesis of Ni—In by Wet Impregnation Using a Sacrificial Support

First, 4.3 g of silica were dissolved in 25 ml of DI water. The 5.3 g of nickel nitrate were dissolved in 5 ml of DI water and 2.57 g of indium chloride were dissolved in 12 ml of DI water. Solutions were mixed together and water was evaporated at T=85 C for 8 h. Dry powder was ground and reduced in $H_2$ atmosphere T=475 C, t=4 h. Silica was removed by means of 7M KOH for 12 hours. Ni—In compound was washed with DI water until neutral pH was achieved.

10) Synthesis of Ni—Zn by Wet Impregnation Using a Sacrificial Support

First, 3.8 g of silica were dissolved in 25 ml of DI water. The 6.3 g of nickel nitrate were dissolved in 5 ml of DI water and 2.54 g of zinc nitrate were dissolved in 4 ml of DI water. Solutions were mixed together and water was evaporated at T=85 C for 8 h. Dry powder was ground and reduced in $H_2$ atmosphere T=450 C, t=4 h. Silica was removed by means of 7M KOH for 12 hours. Ni—Zn compound was washed with DI water until neutral pH was achieved.

11) Synthesis of Ni—Mn by Spray Pyrolysis Method

First, 2.3 g of nickel nitrate were dissolved in 5 ml of DI water and 0.77 g of manganese nitrate were dissolved in 4 ml of DI water. Solutions were mixed together and atomized by using of high energy ultrasound bath. The droplets of solutions were transferred through preheated furnace (T=250 C). Dry powder was collected on the Teflon filter at the cold end of the furnace and reduced in $H_2$ atmosphere T=450 C, t=4 h.

12) Synthesis of Ni—Co by Spray Pyrolysis Method

First, 4.3 g of nickel nitrate were dissolved in 5 ml of DI water and 1.78 g of cobalt nitrate were dissolved in 14 ml of DI water. Solutions were mixed together and atomized by using of high energy ultrasound bath. The droplets of solutions were transferred through preheated furnace (T=250 C). Dry powder was collected on the Teflon filter at the cold end of the furnace and reduced in $H_2$ atmosphere T=460 C, t=4 h.

13) Synthesis of Ni—Fe by Spray Pyrolysis Method

First, 2.3 g of nickel nitrate were dissolved in 15 ml of DI water and 0.77 g of iron nitrate were dissolved in 24 ml of DI water. Solutions were mixed together and atomized by using of high energy ultrasound bath. The droplets of solutions were transferred through preheated furnace (T=250 C). Dry powder was collected on the Teflon filter at the cold end of the furnace and reduced in $H_2$ atmosphere T=450 C, t=4 h.

14) Synthesis of Ni—Bi by Spray Pyrolysis Method

First, 5.3 g of nickel nitrate were dissolved in 25 ml of DI water and 2.45 g of bismuth nitrate were dissolved in 25 ml of DI water. Solutions were mixed together and atomized by using of high energy ultrasound bath. The droplets of solutions were transferred through preheated furnace (T=250 C). Dry powder was collected on the Teflon filter at the cold end of the furnace and reduced in $H_2$ atmosphere T=650 C, t=4 h.

15) Synthesis of Ni—Cr by Spray Pyrolysis Method

First, 2.3 g of nickel nitrate were dissolved in 25 ml of DI water and 0.37 g of chromium nitrate were dissolved in 40 ml of DI water. Solutions were mixed together and atomized by using of high energy ultrasound bath. The droplets of solutions were transferred through preheated furnace (T=250 C). Dry powder was collected on the Teflon filter at the cold end of the furnace and reduced in $H_2$ atmosphere T=460 C, t=4 h.

16) Synthesis of Ni—Mn/C by Mechanochemical Method

First, 2.3 g of nickel nitrate were dissolved in 5 ml of DI water and 0.77 g of manganese nitrate were dissolved in 4 ml of DI water. Solutions were mixed together and 2 g of high surface area carbon was added, followed by homogenization with high energy ultrasound bath. Water was evaporated at T=85 C for 14 h. Dry powder was ground and reduced in $H_2$ atmosphere T=450 C, t=4 h.

17) Synthesis of Ni—Co/C by Mechanochemical Method

First, 4.3 g of nickel nitrate were dissolved in 15 ml of DI water and 1.54 g of cobalt nitrate were dissolved in 14 ml of DI water. Solutions were mixed together and 3.2 g of high surface area carbon was added, followed by homogenization with high energy ultrasound bath. Water was evaporated at T=85 C for 14 h. Dry powder was ground and reduced in $H_2$ atmosphere T=475 C, t=4 h.

18) Synthesis of Ni—Fe/C by Mechanochemical Method

First, 2.3 g of nickel nitrate were dissolved in 50 ml of DI water and 0.77 g of iron nitrate were dissolved in 4 ml of DI water. Solutions were mixed together and 1.2 g of high surface area carbon was added, followed by homogenization with high energy ultrasound bath. Water was evaporated at T=85 C for 14 h. Dry powder was ground and reduced in $H_2$ atmosphere T=450 C, t=4 h.

19) Synthesis of Ni—Sn/C by Mechanochemical Method

First, 1.3 g of nickel nitrate were dissolved in 5 ml of DI water and 0.44 g of $SnCl_4$ were dissolved in 4 ml of DI water. Solutions were mixed together and 2 g of high surface area carbon was added, followed by homogenization with high energy ultrasound bath. Water was evaporated at T=85 C for 14 h. Dry powder was ground and reduced in $H_2$ atmosphere T=550 C, t=4 h.

20) Synthesis of Ni—Mn/C by Mechanochemical and Sacrificial Support Method

First, 2.3 g of nickel nitrate were dissolved in 5 ml of DI water and 0.77 g of manganese nitrate were dissolved in 4 ml of DI water. Solutions were mixed together and 2 g of silica was added, followed by homogenization with high energy ultrasound bath. Water was evaporated at T=85 C for 14 h. Dry powder was ground and reduced in $H_2$ atmosphere T=450 C, t=4 h. Silica was removed by means of 7M KOH for 12 hours. Material was washed with DI water until pH=7 was achieved.

21) Synthesis of Ni—Co/C by Mechanochemical and Sacrificial Support Method

First, 3.3 g of nickel nitrate were dissolved in 5 ml of DI water and 1.27 g of cobalt nitrate were dissolved in 4 ml of DI water. Solutions were mixed together and 2 g of silica was added, followed by homogenization with high energy ultrasound bath. Water was evaporated at T=85 C for 14 h. Dry powder was ground and reduced in $H_2$ atmosphere T=450 C, t=4 h. Silica was removed by means of 7M KOH for 12 hours. Material was washed with DI water until pH=7 was achieved.

22) Synthesis of Ni—Cr/C by Mechanochemical and Sacrificial Support Method

First, 4.3 g of nickel nitrate were dissolved in 5 ml of DI water and 2.77 g of chromium nitrate were dissolved in 4 ml of DI water. Solutions were mixed together and 3 g of silica was added, followed by homogenization with high energy ultrasound bath. Water was evaporated at T=85 C for 14 h. Dry powder was ground and reduced in $H_2$ atmosphere T=550 C, t=4 h. Silica was removed by means of 7M KOH for 12 hours. Material was washed with DI water until pH=7 was achieved.

23) Synthesis of Ni—Mn by Spray Pyrolysis and Sacrificial Support Method

First, 2.3 g of nickel nitrate were dissolved in 5 ml of DI water and 0.77 g of manganese nitrate were dissolved in 4 ml of DI water. Solutions were mixed together and 2 g of silica was added, followed by homogenization with high energy ultrasound bath. Solution was atomized with high energy ultrasound bath and transferred through preheated furnace at T=250 C. Dry powder was collected on the Teflon filter and reduced in $H_2$ atmosphere T=450 C, t=4 h. Silica was removed by means of 7M KOH for 12 hours. Material was washed with DI water until pH=7 was achieved.

24) Synthesis of Ni—Co by Spray Pyrolysis and Sacrificial Support Method

First, 3.3 g of nickel nitrate were dissolved in 15 ml of DI water and 1.74 g of cobalt nitrate were dissolved in 14 ml of DI water. Solutions were mixed together and 2.8 g of silica was added, followed by homogenization with high energy ultrasound bath. Solution was atomized with high energy ultrasound bath and transferred through preheated furnace at T=250 C. Dry powder was collected on the Teflon filter and reduced in $H_2$ atmosphere T=450 C, t=4 h. Silica was removed by means of 7M KOH for 12 hours. Material was washed with DI water until pH=7 was achieved.

25) Synthesis of Ni—Nb by Spray Pyrolysis and Sacrificial Support Method

First, 2.3 g of nickel nitrate were dissolved in 50 ml of DI water and 1.87 g of niobium chloride were dissolved in 4 ml of DI water. Solutions were mixed together and 2 g of silica was added, followed by homogenization with high energy ultrasound bath. Solution was atomized with high energy ultrasound bath and transferred through preheated furnace at T=250 C. Dry powder was collected on the Teflon filter and reduced in $H_2$ atmosphere T=650 C, t=5 h. Silica was removed by means of 7M KOH for 12 hours. Material was washed with DI water until pH=7 was achieved.

26) Synthesis of Ni—Cu/C (Ketjen Black)

Figure 36:
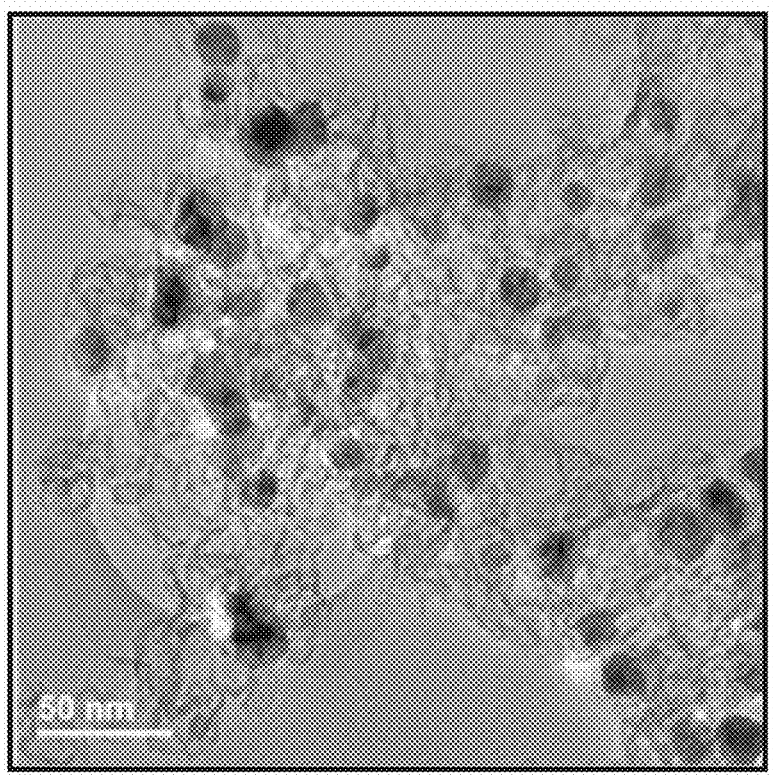
FIG. 36 is a TEM image of NiCu/KB formed using the techniques described here.
Figure 37:
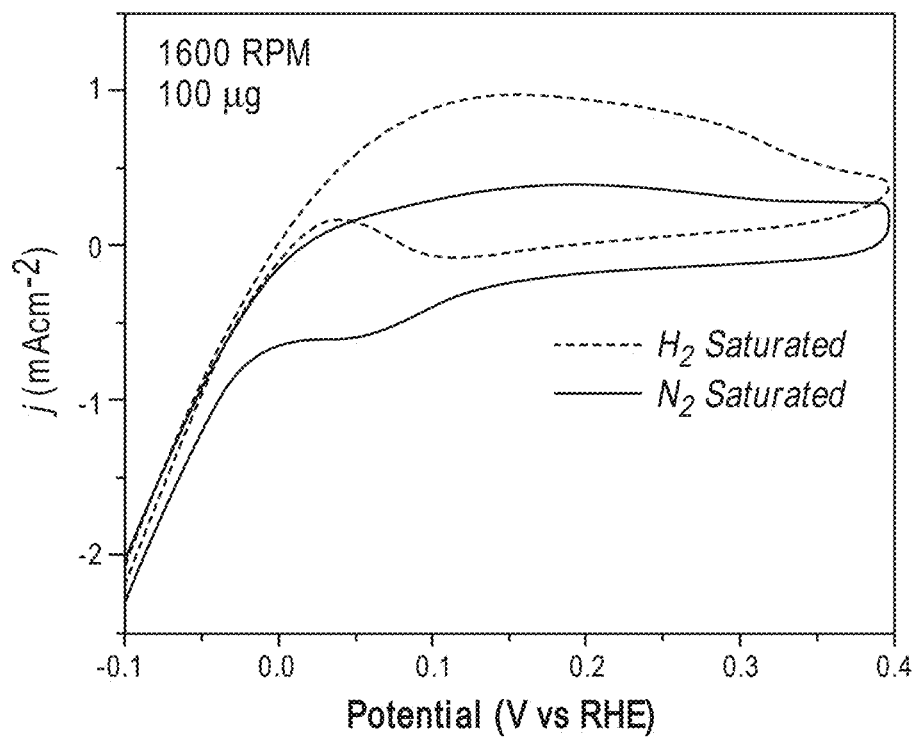
FIG. 37 is a cyclic voltammogram showing the electrochemical activity of the NiCu/KB of FIG. 36.
Figure 38:
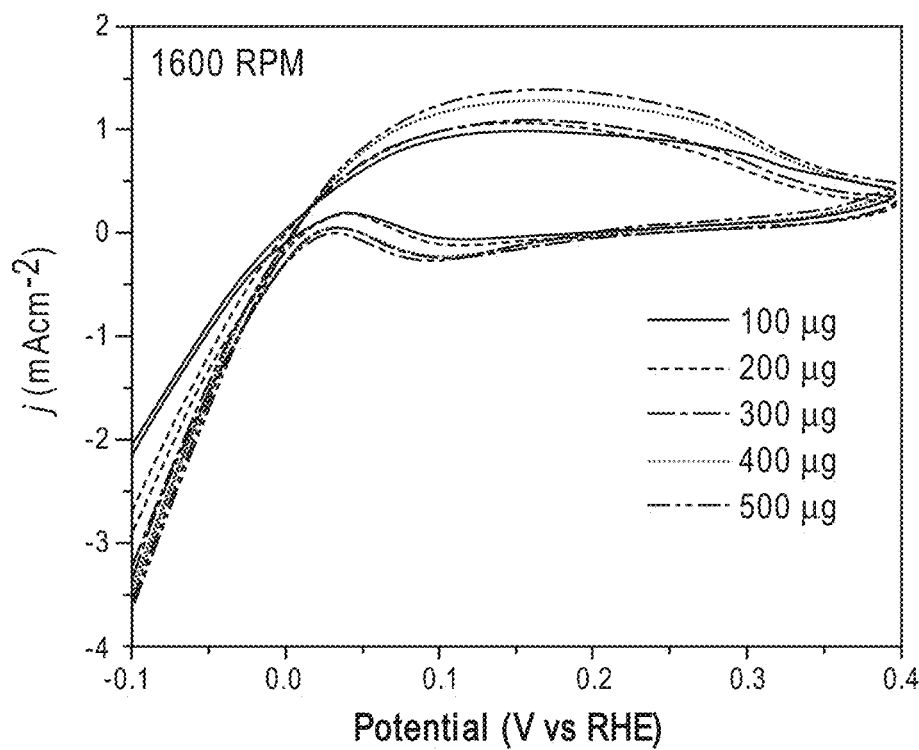
FIG. 38 is another cyclic voltammogram showing the electrochemical activity of the NiCu/KB of FIG. 36.

Nickel nitrate and copper nitrate were dissolved in a minimal amount of deionized water to produce an atomic ratio of 95:5 Ni to Cu and impregnated on Ketjen Black EC600J to produce a metal loading of 50 wt %. Impregnation was achieved by finely mixing the slurry using a glass mortar and pestle followed by drying at T=60° C. The dried powder was then reduced in a hydrogen atmosphere (7 at %, 100 sccm) at T=550° C. for 60 minutes. Once cooled, the reactor (1" I.D. quartz tube) was left for 8-12 hours under a small partial pressure of oxygen (~0.1 at %) to passivate the pyrophoric NiCu/KB catalyst. FIG. 36 is a TEM image of the NiCu/KB showing the nanoparticles to be well dispersed on the carbon support. The NiCu particles ranged in size from 8 nm to >50 nm with an average particle size of 22 nm and standard deviation of 9 nm. Analysis of the X-ray diffraction pattern showed a single FCC Ni phase with a lattice constant of 3.52 Å and an average crystallite size of 27 nm, calculated from whole pattern refinement. FIGS. 37 and 38 show cyclic voltammograms in N2 vs H2 saturated electrolyte, confirming activity of the NiCu/KB towards HOR.

27) Synthesis of NiCu/C (Ketjen Black/DENKA/4-aminoantipyrine)

Figure 39:
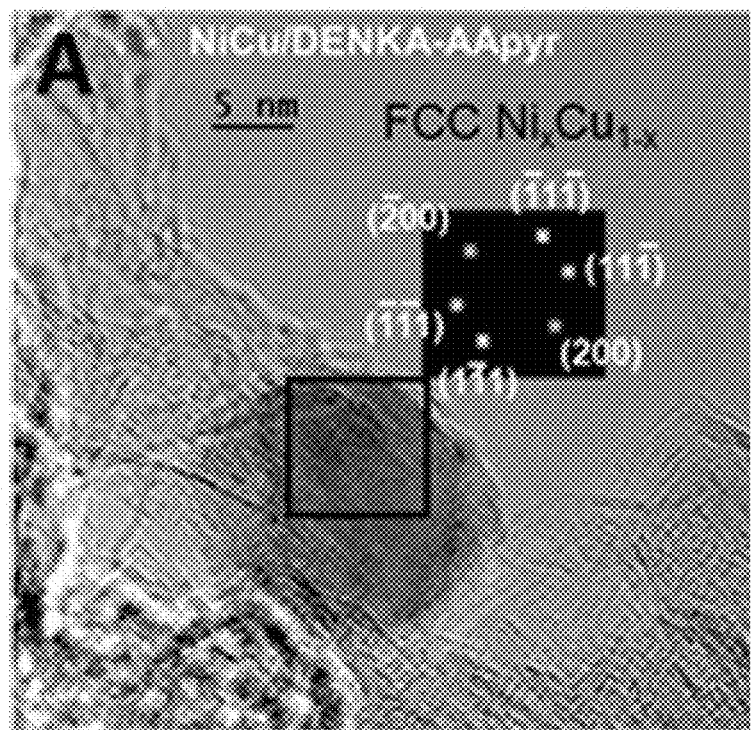
FIG. 39 is an HRTEM image of NiCu/DENKA formed using the methods described herein.
Figure 40:
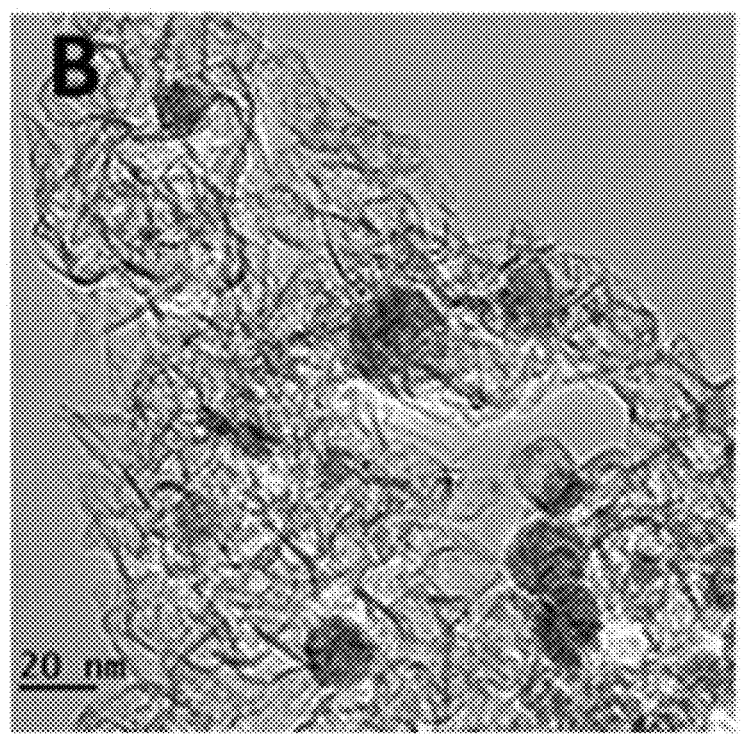
FIG. 40 is another HRTEM image of NiCu/DENKA formed using the methods described herein.
Figure 41:
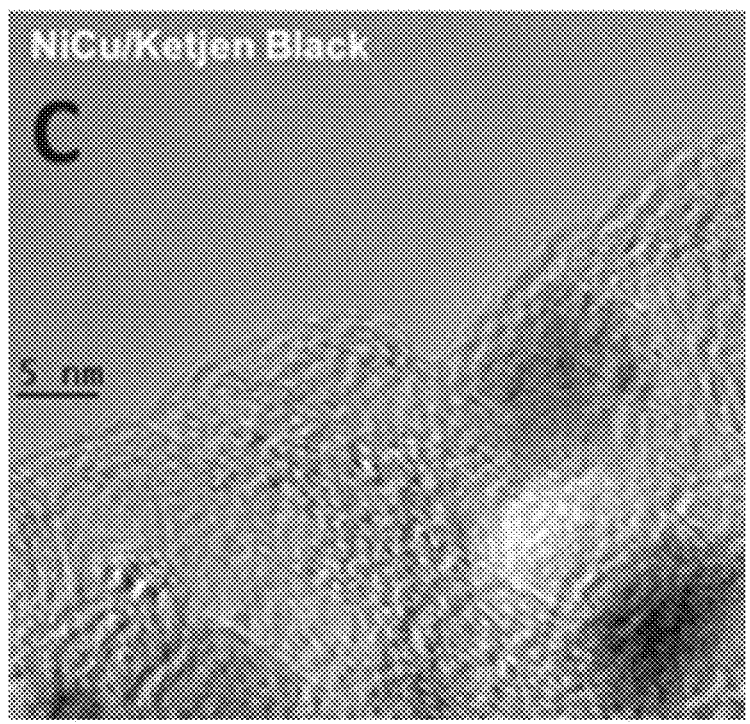
FIG. 41 is HRTEM image of NiCu/KB formed using the methods described herein.
Figure 42:
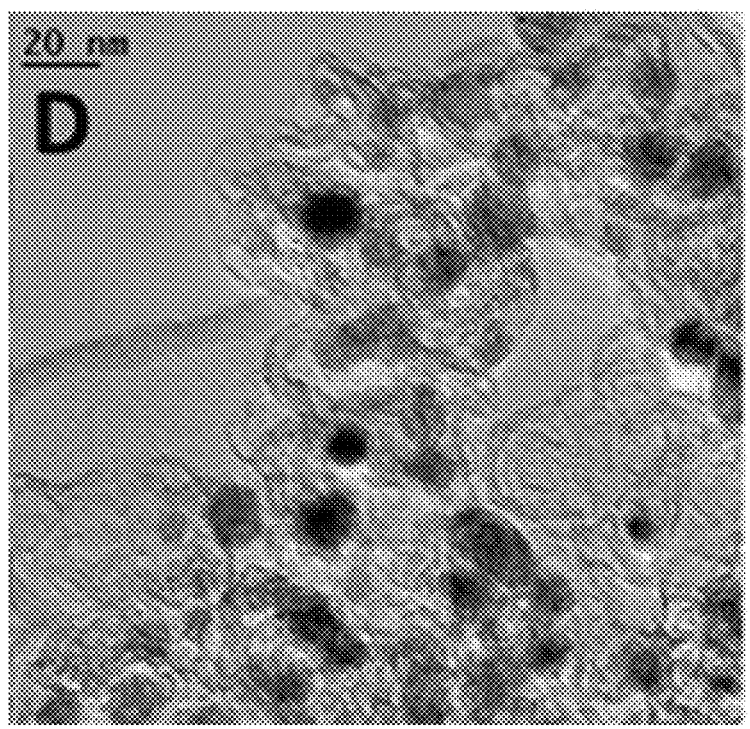
FIG. 42 is another HRTEM image of NiCu/KB formed using the methods described herein.
Figure 43:
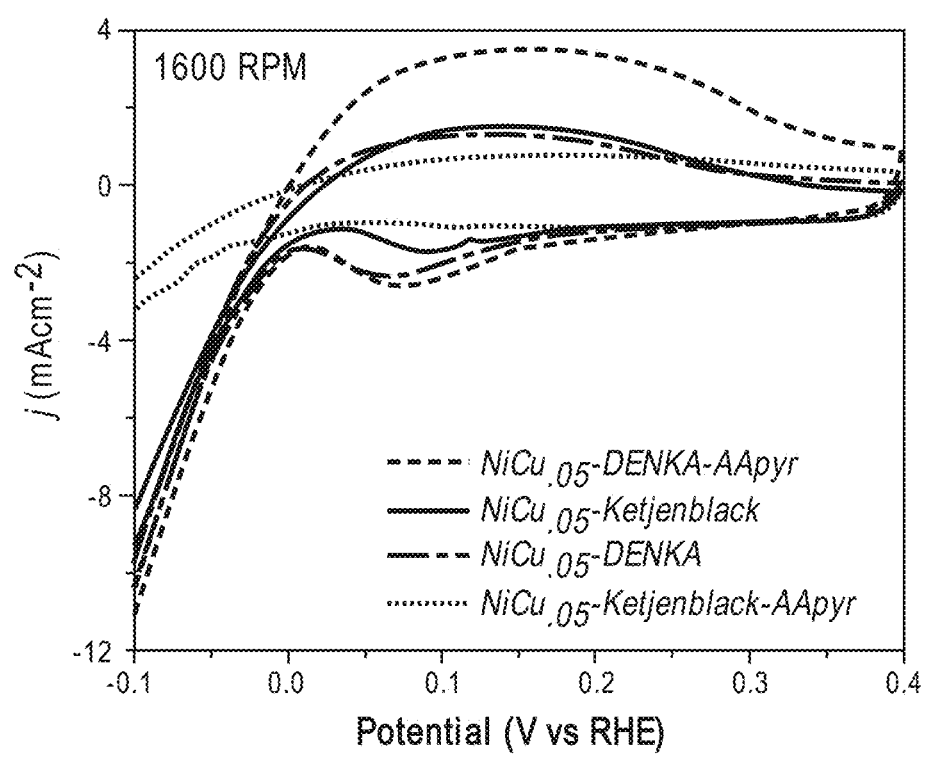
FIG. 43 is a cyclic voltammogram showing the electrochemical activity of the NiCu/KB.

A solution containing Nickel nitrate and copper nitrate was dissolved in a minimal amount of deionized water (18 MΩ) to produce an atomic ratio of 95:5 Ni to Cu and impregnated onto Ketjenblack® EC600J (KB) or DENKA Black® to give a total metal loading on the carbon support of 50 wt %. Samples were also prepared with a reducing agent, 4-aminoantipyrine (AApyr), where 150 mg/$g_{catalyst}$ was dissolved along with the metal nitrates prior to impregnation onto the carbon supports. The material was then dried at 60° C. in air. Once dried, the material was pyrolyzed in 7 at % $H_2$, $N_2$ balance at 550° C. The reactor (1" O.D. quartz tube in a single zone clamshell furnace) was heated at a rate of 10° C./min to 150° C., then 2° C./min to 250° C. and held for 30 min, followed by 5° C./min to 550° C. and held for 1 hr. In order to passivate the pyrophoric NiCu/carbon catalysts to prevent bulk oxidation upon exposure to atmospheric $O_2$, the reactor was allowed to cool to room temperature and flushed with $N_2$, the gas flow was then turned off and the reactor left overnight to allow $O_2$ to diffuse in. FIGS. 39-42 are HRTEM images of NiCu/DENKA (FIGS. 39 and 40) and NiCu/KB (FIGS. 41 and 42). The inset for FIG. 39 shows the selected area FFT of a NiCu particle indexed as the (111) and (200) reflections of FCC Ni. For all catalyst samples, the NiCu particles show no segregation as the particles are well dispersed onto the carbon supports. FIG. 43 shows cyclic voltammograms in $H_2$ saturated 0.1M KOH with a rotation rate of 1600 RPM, confirming activity of the catalysts towards HOR.

28) Synthesis of NiMo/C (KetjenBlack)

Figure 44:
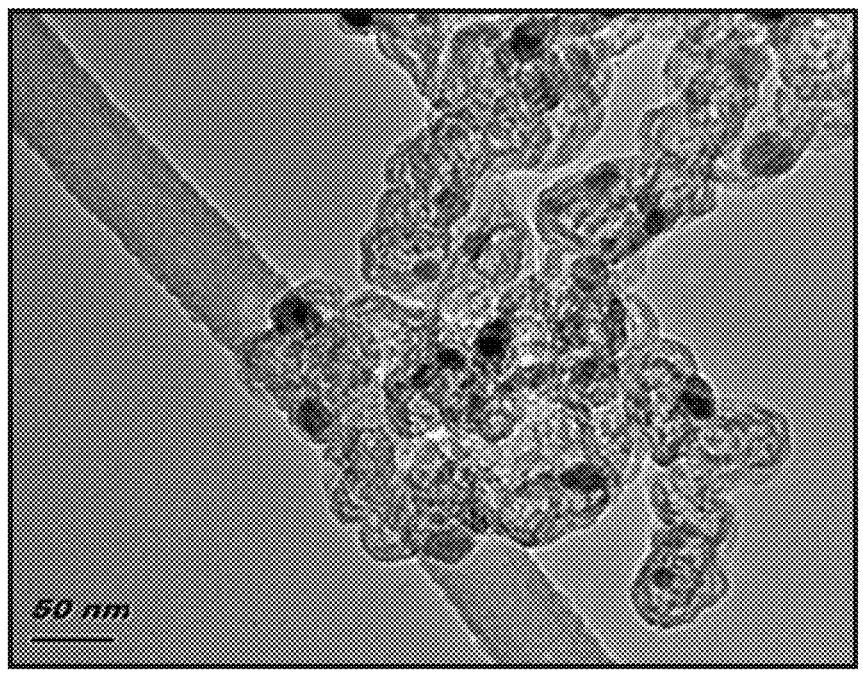
FIG. 44 is a TEM image of NiMo/KB.
Figure 45:
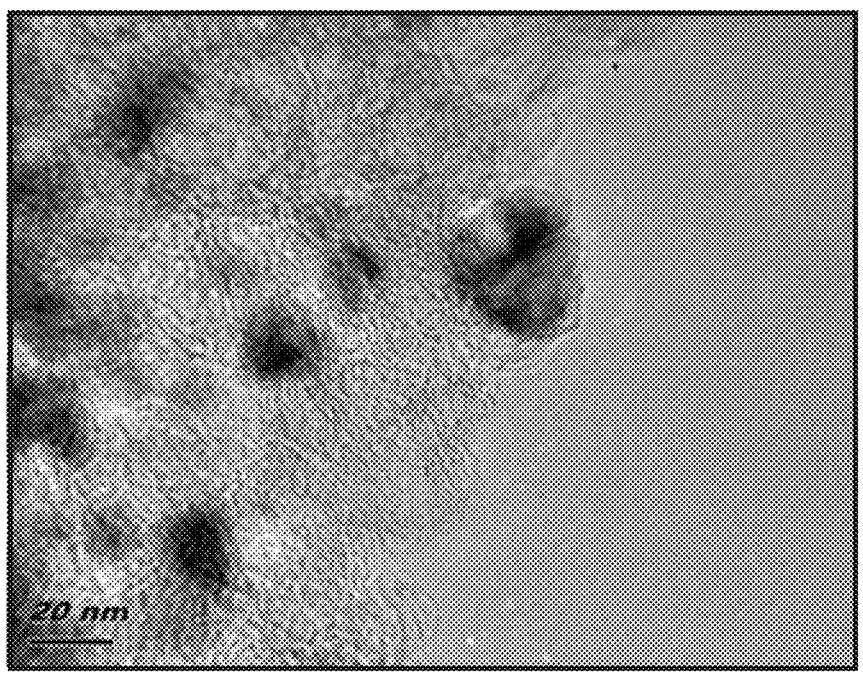
FIG. 45 is another TEM image of NiMo/KB.
Figure 46:
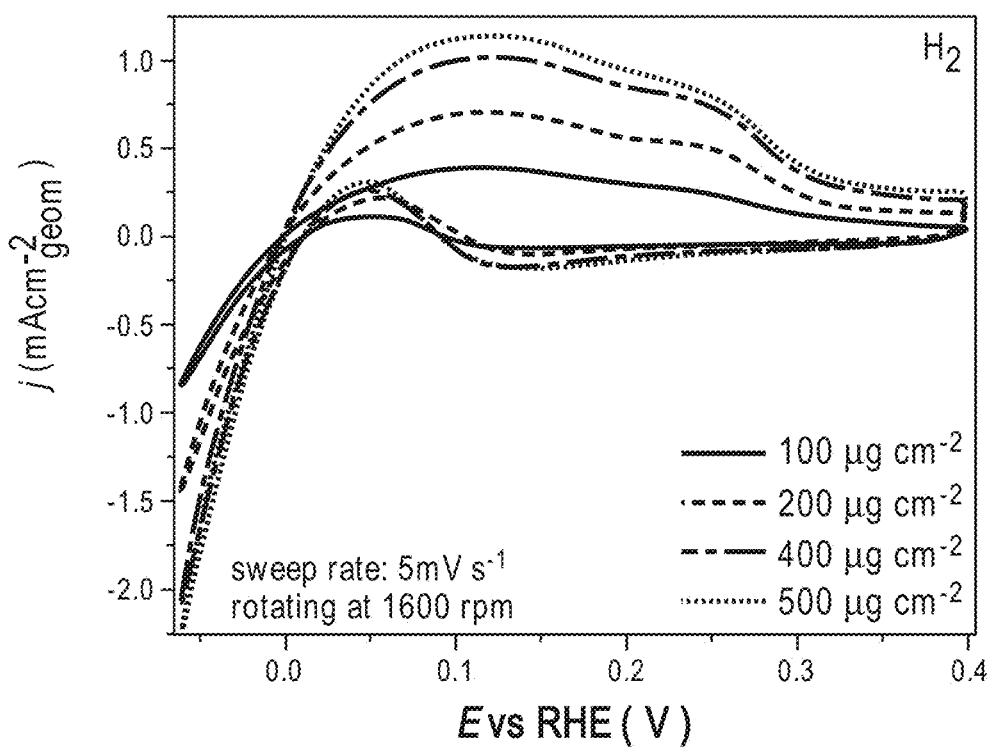
FIG. 46 is a cyclic voltammogram showing the electrochemical activity of NiMo/KB.

A mixture of nickel nitrate and ammonium molybdate was dissolved in a small volume of water and impregnated on the carbon support (KetjenBlack, surface area~1200 $m^2$ $g^{-1}$). The atomic ratio between Ni and Mo was selected as 90:10. The mixture was placed in an oven at T=85° C. and water was allowed to evaporate. The dry composite mixture was ground with mortar and pestle. The fine powder was reduced in a hydrogen atmosphere (flow rate of 100 ccm) at T=550° C. for 60 minutes. Considering that finely divided Ni is pyrophoric, before exposing the catalyst to the ambient, it was passivated in a He flow containing 2% of $O_2$ at room temperature for 8 hours. FIGS. 44 and 45 show TEM images of the NiMo/KB catalyst at different magnifications. It can be seen that the particles are evenly distributed on the surface of the KetjenBlack with no particle agglomeration. FIG. 46 shows cyclic voltammograms with various loadings in $H_2$-saturated 0.1 M NaOH at a sweep rate of 5 mV $s^{-1}$ and rotating speed of 1600 RPM.

What is claimed is:

1. A method for forming an electrooxidative material comprising:
   mixing:
      precursors of Ni wherein the precursors are selected from the group consisting of metal nitrates, chlorides, and acetates:
      precursors of an electrooxidative metal selected from the group consisting of copper (Cu) and molybdenum (Mo); and
      particulate supporting material or precursor thereof, to form a mixture wherein the supporting material or precursor thereof is dispersed within the mixture;
      wherein the Ni precursors and electro oxidative metal precursors are mixed at a ratio of between 85:15 and 97:3 and
   heat treating the mixture, thus forming an electrooxidative material having an irregular and unpredictable structure shape.

2. The method of claim 1 wherein the Ni and electro oxidative metal are mixed at a ratio of between 90:10 and 95:5.

3. The method of claim 1 wherein the Ni and electro oxidative metal are mixed at a ratio of 90:10.

4. The method of claim 1 wherein the Ni and electro oxidative metal are mixed at a ratio of 95:5.

5. The method of claim 1 wherein the particulate supporting material is carbon-based.

6. The method of claim 5 wherein the particulate supporting material is a carbon black material.

7. The method of claim 1 wherein the dispersed particulate supporting material further comprises a sacrificial support, the method further comprising removing the sacrificial support after the heat treatment to produce a porous electrooxidative material.

8. The method of claim 7 wherein the dispersed particulate supporting material is only a sacrificial support, the method further comprising removing the sacrificial support after the heat treatment to produce a self-supported porous electrooxidative material.

9. The method of claim 1 wherein the supporting material is non-porous.

10. The method of claim 1 further comprising atomizing the mixture.

11. The method of claim 1 further comprising ball-milling the mixture.

12. A material formed by the method of claim 1.

13. A material formed by the method of claim 1.

\* \* \* \* \*